United States Patent [19]

Yanagihara

[11] Patent Number: 5,557,479
[45] Date of Patent: Sep. 17, 1996

[54] APPARATUS AND METHOD FOR RECORDING AND REPRODUCING DIGITAL VIDEO SIGNAL DATA BY DIVIDING THE DATA AND ENCODING IT ON MULTIPLE CODING PATHS

[75] Inventor: Naofumi Yanagihara, Tokyo, Japan

[73] Assignee: Sony Corporation, Tokyo, Japan

[21] Appl. No.: 568,403

[22] Filed: Dec. 15, 1995

Related U.S. Application Data

[63] Continuation of Ser. No. 245,760, May 18, 1994, abandoned.

[30] Foreign Application Priority Data

| May 24, 1993 | [JP] | Japan | ............................ 5-144199 |
| Jul. 13, 1993 | [JP] | Japan | ............................ 5-195532 |
| Aug. 25, 1993 | [JP] | Japan | ............................ 5-232292 |

[51] Int. Cl.⁶ ........................... G11B 5/00; H04N 5/76
[52] U.S. Cl. ........................ 360/32; 360/48; 358/335
[58] Field of Search ................. 360/32, 48; 358/310, 358/335

[56] References Cited

U.S. PATENT DOCUMENTS

| 5,065,259 | 11/1991 | Kubata et al. | .................. 360/32 |
| 5,220,435 | 6/1993 | Yamaguchi et al. | .................. 360/32 |
| 5,257,107 | 10/1993 | Hwang et al. | .................. 360/32 |
| 5,257,141 | 10/1993 | Matsumi et al. | .................. 360/32 |
| 5,263,100 | 11/1993 | Kim et al. | .................. 382/56 |
| 5,384,665 | 1/1995 | Ohkuma et al. | .................. 360/32 |
| 5,384,787 | 1/1995 | Yoshinaka | .................. 358/335 |

*Primary Examiner*—W. Chris Kim
*Attorney, Agent, or Firm*—William S. Frommer; Alvin Sinderbrand

[57] ABSTRACT

An input video signal composed of a luminance signal Y, and color difference signals PR and PB. The video signal is converted into digital signals. A plurality of coding paths are provided. The digital video signals are processed in shuffling circuit, DCT circuit, quantizing circuit, variable length code encoding circuit, and frame segmenting circuit on the coding paths. The signals encoded on the coding paths are converted into data with two channels. The data with two channels are recorded on a recording medium. The data are allocated to a predetermined region of a magnetic tape so that a block of data is reproduced as bursts on a screen in a variable speed reproduction mode.

13 Claims, 45 Drawing Sheets

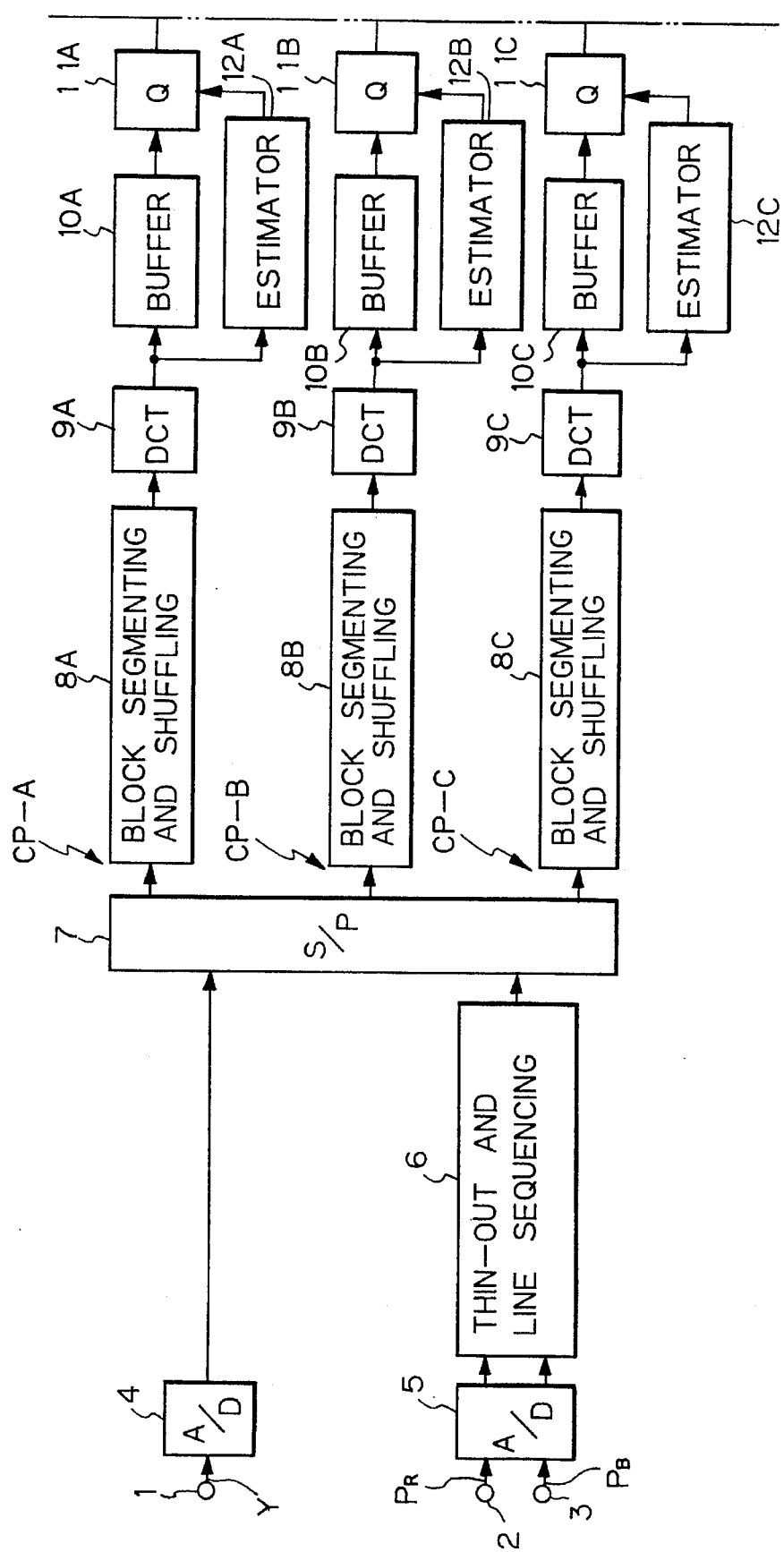

TR1  TR2

| 0 | 11 | 12 |
|---|----|----|
| 1 | 10 | 13 |
| 2 | 9  | 14 |
| 3 | 8  | 15 |
| 4 | 7  | 16 |
| 5 | 6  | 17 |

| | | | | |
|---|---|---|---|---|
| Parity | Parity | Parity | Parity | Parity |
| Pb | Pb | Pb | Pb | |
| Y | Y | Y | Y | |
| Y | Y | Y | Y | |
| Pr | Pr | Pr | Pr | |
| Y | Y | Y | Y | |
| Y | Y | Y | Y | |
| Pb | Pb | Pb | Pb | |
| Y | Y | Y | Y | |
| Y | Y | Y | Y | |
| Pr | Pr | Pr | Pr | |
| Y | Y | Y | Y | |
| Y | Y | Y | Y | |
| SYNC | SYNC | SYNC | SYNC | SYNC |
| ID | ID | ID | ID | ID |
| S | S | S | S | S |

Fig. 23

|   | A | B | C | D | E |
|---|---|---|---|---|---|
| 0 | ▓ |   |   |   |   |
| 1 |   |   |   |   |   |
| 2 |   |   | ▓ |   |   |
| 3 |   |   |   |   |   |
| 4 |   |   |   |   | ▓ |
| 5 |   |   |   |   |   |
| 6 |   | ▓ |   |   |   |
| 7 |   |   |   |   |   |
| 8 |   |   |   | ▓ |   |
| 9 |   |   |   |   |   |

Fig. 26

|    | A | B | C | D | E |
|----|---|---|---|---|---|
| 0  | ▓ |   |   |   |   |
| 1  |   |   |   |   |   |
| 2  |   |   | ▓ |   |   |
| 3  |   |   |   |   |   |
| 4  |   |   |   |   | ▓ |
| 5  |   |   |   |   |   |
| 6  |   | ▓ |   |   |   |
| 7  |   |   |   |   |   |
| 8  |   |   |   | ▓ |   |
| 9  |   |   |   |   |   |
| 10 |   |   |   |   |   |
| 11 |   |   |   |   |   |

Fig. 24A

| 0 | 1 | 22 | 23 | 24 | 25 | 46 | 47 | 48 |
|---|---|----|----|----|----|----|----|----|
| 2 | 3 | 20 | 21 | 26 | 27 | 44 | 45 | 49 |
| 4 | 5 | 18 | 19 | 28 | 29 | 42 | 43 | 50 |
| 6 | 7 | 16 | 17 | 30 | 31 | 40 | 41 | 51 |
| 8 | 9 | 14 | 15 | 32 | 33 | 38 | 39 | 52 |
| 10 | 11 | 12 | 13 | 34 | 35 | 36 | 37 | 53 |

Fig. 24B

| 5 | 6 | 7 | 28 | 29 | 30 | 31 | 52 | 53 |
|---|---|---|----|----|----|----|----|----|
| 4 | 8 | 9 | 26 | 27 | 32 | 33 | 50 | 51 |
| 3 | 10 | 11 | 24 | 25 | 34 | 35 | 48 | 49 |
| 2 | 12 | 13 | 22 | 23 | 36 | 37 | 46 | 47 |
| 1 | 14 | 15 | 20 | 21 | 38 | 39 | 44 | 45 |
| 0 | 16 | 17 | 18 | 19 | 40 | 41 | 42 | 43 |

| | 1 | 10 | 10 | 5 | 10 | 10 | 5 | 10 | 10 | 6 | 8 |
|---|---|---|---|---|---|---|---|---|---|---|---|
| S I D Q N O | Y | Y | Pr/b | Y | Y | Pr/b | Y | Y | Pr/b | Parity |
| S I D Q N O | Y | Y | Pr/b | Y | Y | Pr/b | Y | Y | Pr/b | Parity |
| S I D Q N O | Y | Y | Pr/b | Y | Y | Pr/b | Y | Y | Pr/b | Parity |
| S I D Q N O | Y | Y | Pr/b | Y | Y | Pr/b | Y | Y | Pr/b | Parity |
| S I D Q N O | Y | Y | Pr/b | Y | Y | Pr/b | Y | Y | Pr/b | Parity |

5 ← → 77 → 8

| Y0 | Y1 | Y2 |
|----|----|----|
| Y3 | Y4 | Y5 |

| 0 | 11 | 12 |
|---|----|----|
| 1 | 10 | 13 |
| 2 | 9  | 14 |
| 3 | 8  | 15 |
| 4 | 7  | 16 |
| 5 | 6  | 17 |

B, D

| 5 | 6  | 17 |
|---|----|----|
| 4 | 7  | 16 |
| 3 | 8  | 15 |
| 2 | 9  | 14 |
| 1 | 10 | 13 |
| 0 | 11 | 12 |

E

| 0 | 11 |
|---|----|
| 1 | 10 |
| 2 | 9  |
| 3 | 8  |
| 4 | 7  |
| 5 | 6  |

A, C, E

| 12 | 15 | 16 |
|----|----|----|
| 13 | 14 | 17 |

(UPPER OR LOWER)

B, D

| 13 | 14 | 17 |
|----|----|----|
| 12 | 15 | 16 |

(UPPER OR LOWER)

| 0 | 11 | 12 |
|---|----|----|
| 1 | 10 | 13 |
| 2 | 9  | 14 |
| 3 | 8  | 15 |
| 4 | 7  | 16 |
| 5 | 6  | 17 |

B, D

| 5 | 6  | 17 |
|---|----|----|
| 4 | 7  | 16 |
| 3 | 8  | 15 |
| 2 | 9  | 14 |
| 1 | 10 | 13 |
| 0 | 11 | 12 |

| 0 | 11 | 12 |
|---|----|----|
| 1 | 10 | 13 |
| 2 | 9  | 14 |
| 3 | 8  | 15 |
| 4 | 7  | 16 |
| 5 | 6  | 17 |

B, D

| 5 | 6  | 17 |
|---|----|----|
| 4 | 7  | 16 |
| 3 | 8  | 15 |
| 2 | 9  | 14 |
| 1 | 10 | 13 |
| 0 | 11 | 12 |

Fig. 47

| | 5 | 11 | 11 | 11 | 6 | 11 | 11 | 11 | 5 | 8 |
|---|---|---|---|---|---|---|---|---|---|---|
| | S D I C N Q | Y | Y | Y | Pr | Y | Y | Y | Pb | Parity |
| | S D I C N Q | Y | Y | Y | Pr | Y | Y | Y | Pb | Parity |
| | S D I C N Q | Y | Y | Y | Pr | Y | Y | Y | Pb | Parity |
| | S D I C N Q | Y | Y | Y | Pr | Y | Y | Y | Pb | Parity |
| | S D I C N Q | Y | Y | Y | Pr | Y | Y | Y | Pb | Parity |

(5 rows × 77 columns total; side dimensions: 5, 77, 8)

A, C

| 0 | 1 | 2 | 15 | 16 | 17 | 18 | 19 | 20 |
|---|---|---|----|----|----|----|----|----|
| 3 | 4 | 5 | 12 | 13 | 14 | 21 | 22 | 23 |
| 6 | 7 | 8 | 9  | 10 | 11 | 24 | 25 | 26 |

B, D

| 6 | 7 | 8 | 9  | 10 | 11 | 24 | 25 | 26 |
|---|---|---|----|----|----|----|----|----|
| 3 | 4 | 5 | 12 | 13 | 14 | 21 | 22 | 23 |
| 0 | 1 | 2 | 15 | 16 | 17 | 18 | 19 | 20 |

E

| 0 | 1 | 2 | 15 | 16 | 17 |
|---|---|---|----|----|----|
| 3 | 4 | 5 | 12 | 13 | 14 |
| 6 | 7 | 8 | 9  | 10 | 11 |

A, B, C, D, E

| 18 | 19 | 20 | 21 | 22 | 23 | 24 | 25 | 26 |

(UPPER OR LOWER)

| 0 | 1 | 2 | 15 | 16 | 17 | 18 | 19 | 20 |
|---|---|---|----|----|----|----|----|----|
| 3 | 4 | 5 | 12 | 13 | 14 | 21 | 22 | 23 |
| 6 | 7 | 8 | 9  | 10 | 11 | 24 | 25 | 26 |

B, D

| 6 | 7 | 8 | 9  | 10 | 11 | 24 | 25 | 26 |
|---|---|---|----|----|----|----|----|----|
| 3 | 4 | 5 | 12 | 13 | 14 | 21 | 22 | 23 |
| 0 | 1 | 2 | 15 | 16 | 17 | 18 | 19 | 20 |

| 0 | 1 | 2 | 15 | 16 | 17 | 18 | 19 | 20 |
|---|---|---|----|----|----|----|----|----|
| 3 | 4 | 5 | 12 | 13 | 14 | 21 | 22 | 23 |
| 6 | 7 | 8 | 9  | 10 | 11 | 24 | 25 | 26 |

B,D

| 6 | 7 | 8 | 9  | 10 | 11 | 24 | 25 | 26 |
|---|---|---|----|----|----|----|----|----|
| 3 | 4 | 5 | 12 | 13 | 14 | 21 | 22 | 23 |
| 0 | 1 | 2 | 15 | 16 | 17 | 18 | 19 | 20 |

APPARATUS AND METHOD FOR RECORDING AND REPRODUCING DIGITAL VIDEO SIGNAL DATA BY DIVIDING THE DATA AND ENCODING IT ON MULTIPLE CODING PATHS

This application is a continuation of application Ser. No. 08/245,760, filed May 18, 1994 now abandoned.

BACKGROUND OF THE INVENTION

1. Field of the Invention

The present invention relates to a recording apparatus of a digital video signal, a reproducing apparatus thereof, and a recording method thereof for use with a digital VCR that compresses the digital video signal by a DCT circuit and records the compressed digital video signal on a magnetic tape by a rotating head.

2. Description of the Prior Art

Digital VCRs that convert a digital video signal into a signal with a frequency range by a DCT (Discrete Cosine Transform) circuit, compress the converted signal by variable length code encoding circuit, and record the compressed signal on a magnetic tape by a rotating head have been developed. FIG. 1 shows the construction of a recording system of such a conventional digital VCR. In this example, a video signal corresponding to the conventional television system such as the NTSC-system, PAL system, or the like is recorded corresponding to a component system.

In FIG. 1, reference numeral 101 is an input terminal of a luminance signal Y. Reference numerals 102 and 103 are input terminals of color difference signals R-Y and B-Y, respectively. Reference numeral 104 is an A/D converter that converts the analog luminance signal into a digital signal. Reference numeral 105 is an A/D converter that converts the analog color difference signals R-Y and B-Y into respective digital signals. The luminance signal received from the input terminal 101 is supplied to the A/D converter 104. The A/D converter 104 converts the luminance signal into a digital signal with a sampling frequency of 13.5 MHz. The color difference signals R-Y and B-Y received from the input terminals 102 and 103 are supplied to the A/D converter 105. The A/D converter 105 converts the color difference signals R-Y and B-Y into respective digital signals with a sampling frequency of 6.75 MHz. Thus, so-called (4, 2, 2) component video signals, where the relation of information amounts of luminance signal Y, and color difference signals U and V is 4:2:2, are input.

Reference numeral 106 is a thin-out and line sequencing circuit. The thin-out and line sequencing circuit 106 halves samples of the color difference signals R-Y and B-Y converted by the A/D converter 105 in vertical direction and arranges the color difference signals R-Y and B-Y in line sequence. Thus, so-called 4:2:0 sampling construction takes place.

Reference numeral 107 is a block segmenting and shuffling circuit. The block segmenting and shuffling circuit 107 shuffles the digital signals as so-called macro-blocks. One DCT block, which is a unit of DCT operation, is composed of eight pixels in the horizontal direction times eight pixels in the vertical direction. One macro-block is composed of four DCT blocks of a luminance signal, one DCT block of a corresponding R-Y signal, one DCT block of a corresponding B-Y signal construct one DCT block, namely a total of six macro-blocks. The macro-blocks are shuffled so as to equally compress the entire image.

Reference numeral 108 is a DCT circuit. Reference numeral 109 is a buffer circuit. Reference 110 is a quantizing circuit. Reference numeral 111 is an estimator. An output of the block segmenting and shuffling circuit 107 is supplied to the DCT circuit 108. The DCT circuit 108 transforms sample data, composed of eight pixels in the horizontal direction times eight pixels in the vertical direction, into data with a frequency range corresponding to two-dimensional discrete cosine transform technique. The resultant data is supplied to both the buffer 109 and the estimator 111.

The buffer 109 has a fixed buffer amount. In this case, the buffer amount of the buffer 109 is equivalent to five macro-blocks (namely, five sync blocks). The estimator 111 estimates the code amount of the fixed buffer amount of data that a particular quantizes into a variable length code and selects an optimum quantizing table so that the fixed buffer amount becomes equal to or less than the predetermined code amount.

The quantizer 110 has various quantizing tables. The estimator 111 selects an optimum quantizing table so that the total code amount of the buffer amount becomes equal to or less than the predetermined amount. The DCT data stored in the buffer 109 is quantized by the quantizer 110.

Reference numeral 112 is a variable length code encoding circuit. The variable length code encoding circuit 112 encodes data into a variable length code such as a two-dimensional Huffman code.

Reference numeral 113 is a frame segmenting circuit. The frame segmenting circuit 113 places a predetermined pattern sync at the beginning of the record data so as to perform an error correction code encoding process and develop the record data into frames. An output of the variable length code encoding circuit 112 is supplied to the frame segmenting circuit 113. In this example, data of one macro-block is allocated to one sync block.

Reference numeral 114 is a channel encoder. Frame-segmented data is supplied to the channel encoder 114. The channel encoder 114 modulates the frame segmented data corresponding to a predetermined modulation system. An output of the channel encoder 114 is supplied to rotating heads 116A and 116B through recording amplifiers 115A and 115B, respectively. The rotating heads 116A and 116B record compressed video signals on a magnetic tape (not shown).

The rotating heads 116A and 116B have different azimuth angles. A rotating drum is rotated at 150 Hz. Thus, when a video signal of the NTSC system with a field frequency of 60 Hz is recorded, the number of tracks per frame is 10. On the other hand, when a video signal of the PAL system with a field frequency of 50 Hz is recorded, the number of tracks per frame is 12.

In the above-described prior art reference, a video signal of a conventional television system such as the NTSC system, the PAL system, or the like is recorded through the DCT process and the variable length code encoding process. A system for allowing such a digital VCR to further record a HDTV (High Definition Television) signal has been proposed. When a video signal of the conventional television system is recorded, the two rotating heads 116A and 116B are used. However, to record a HDTV signal, four rotating heads should be disposed on a rotating drum. When the HDTV signal is recorded, the tape running speed should be twice as high as that of the conventional television system.

When the HDTV signal is recorded, the operation speed of the digital VCR should be raised so as to process the HDTV signal with a high transmission rate. If the video signal recording circuit used for the conventional NTSC system and the PAL system is used in common with the HDTV system, the circuit scale of the VCR can be reduced.

In addition, such a digital VCR is required to be reproduced in variable speed reproduction mode with high picture quality. Thus, when a HDTV signal is recorded by such a digital VCR, data assignment on tracks should be considered so that good picture quality can be obtained in the variable speed reproduction mode.

OBJECTS AND SUMMARY OF THE INVENTION

Thus, an object of the present invention is to provide a recording apparatus of a digital video signal, a reproducing apparatus thereof, and a recording method thereof that can easily process a HDTV signal with a high transmission rate.

Another object of the present invention is to provide a recording apparatus of a digital video signal, a reproducing apparatus thereof, and a recording method thereof that can commonly use a recording circuit for both a conventional television signal and a HDTV signal.

A further object of the present invention is to provide a recording apparatus of a digital video signal, a reproducing apparatus thereof, and a recording method thereof that provide a high quality picture of a HDTV signal in a variable speed reproduction mode.

A first aspect of the present invention is a digital video signal recording apparatus, comprising an analog-to-digital converting circuit for converting an analog luminance signal and color difference signals into respective digital signals, and a dividing circuit for dividing the digital luminance signal and the digital color difference signals into a plurality of coding paths, the coding paths being adapted to perform an encoding process so as to compress and encode the digital luminance signal and the digital color difference signals, each of the coding paths including a block shuffling circuit for block segmenting and shuffling output signals of the analog-to-digital converting circuit, a DCT circuit for performing two-dimensional discrete cosine transform operation for an output signal of the block shuffling circuit, a buffer circuit having a storage capacity for buffering an output signal of the DCT circuit, an estimator for estimating a data amount of a predetermined buffer amount to be output, a quantizing circuit for setting a quantizing scale corresponding to an output of the estimator and for quantizing an output of the DCT circuit, a variable length code encoding circuit for encoding an output of the quantizing circuit into variable length code, a frame segmenting circuit for placing a predetermined sync pattern to an output signal of the variable length code encoding circuit so as to perform error correction encoding, and a deshuffling circuit for deshuffling the output signal of the frame segmenting circuit, a channel converting circuit for converting output signals received from the coding paths to signals with a predetermined number of channels, and a recording circuit for recording output signals of the channel converting circuit on a predetermined recording medium.

The number of the coding paths is three.

The number of the predetermined channels is two, the channel converting circuit being adapted to allocate data to a predetermined region of a magnetic tape so that a block of data is reproduced as bursts on a screen in a variable speed reproduction mode.

When a HDTV signal is recorded, a horizontal shuffling size and a vertical shuffling size of macro-blocks are a multiple of three blocks of a luminance signal and a multiple of two blocks of the luminance signal, respectively. The number of valid samples for one screen of the HDTV signal is nearly the same as a multiple of the horizontal shuffling size of the macro-blocks, the number of lines of the HDTV signal for one screen being nearly the same as the vertical shuffling size of the macro-blocks. One screen of the HDTV signal is divided into the sub screens, the macro-blocks being shuffled in the sub screens, and the macro-blocks being compressed.

A second aspect of the present invention is a digital video signal reproducing apparatus, comprising a reproducing circuit for reproducing predetermined record signals with a predetermined number of channels from a recording medium, and a channel converting circuit for dividing output signals of the reproducing circuit into signals with a predetermined number of channels, wherein the decoding paths include a shuffling circuit for shuffling the reproduced signals, a variable length code decoding circuit for decoding the reproduced signal, an inverse-quantizing circuit for inverse-quantizing output signals of the variable length code decoding circuit, an inverse-DCT circuit for performing an inverse-DCT operation for output signals of the inverse-quantizing circuit, and a deshuffling circuit for deshuffling output signals of the shuffling circuit.

A third aspect of the present invention is a digital video signal recording method, comprising the steps of converting an analog luminance signal and color difference signals into respective digital signals, and dividing the digital luminance signal and the digital color difference signals into a plurality of coding paths, the coding paths being adapted to perform a coding process so as to compress and encode the digital luminance signal and the color difference signals, the coding process including block segmenting and shuffling output signals of the analog-to-digital converting circuit, performing two-dimesional discrete cosine transform operation for an output signal of the block shuffling circuit, buffering an output signal of the DCT circuit and estimating a data amount of a predetermined buffer amount, setting a quantizing scale corresponding to an output of the estimator and quantizing an output of the DCT circuit, encoding an output of the quantizing circuit into variable length code, placing a predetermined sync pattern to an output signal of the variable length code encoding circuit so as to perform error correction encoding, and deshuffling the output signal of the block segmenting and shuffling circuit, converting output signals received from the coding paths to signals with a predetermined number of channels, and recording output signals of the channel converting circuit on a predetermined recording medium.

BRIEF DESCRIPTION OF THE DRAWINGS

FIGS. 2A and 2B are block diagrams showing a construction of a recording system of a digital VCR according to the present invention;

FIGS. 10, 11A to 11C, 12, 13, 14, 15A to 15D, 16, and 17 are schematic diagrams for explaining a shuffling operation in the case that a (1125/60) HDTV signal is recorded;

FIG. 18 is a schematic diagram showing a composition of a frame;

FIGS. 19, 23, and 24A to 24D are schematic diagrams for explaining a shuffling operation in the case that a (1250/50) HDTV signal and a (1050/60) HDTV signal are recorded;

FIG. 25 is a schematic diagram showing another composition of a frame;

FIG. 26 is a schematic diagram for explaining a composition of a frame of a (1250/50) HDTV signal;

FIGS. 35 to 38 are schematic diagrams for explaining another shuffling operation in the case that a (1125/60) HDTV signal is recorded;

FIGS. 39 to 42 are schematic diagrams for explaining another shuffling operation in the case that a (1050/60) HDTV signal is recorded;

FIGS. 43 to 46 are schematic diagrams for explaining another shuffling operation in the case that a (1250/50) HDTV signal is recorded;

FIG. 47 is a schematic diagram showing a further composition of a frame;

FIGS. 55 to 58 are schematic diagrams for explaining a further shuffling operation in the case that a (1050/60) HDTV signal is recorded; and FIGS. 59 to 62 are schematic diagrams for explaining a further shuffling operation in the case that a (1250/50) HDTV signal is recorded.

DETAILED DESCRIPTION OF THE PREFERRED EMBODIMENTS

Next, with reference to the accompanying drawings, an embodiment of the present invention will be described. In this embodiment, a digital HDTV signal of a base band is recorded and reproduced through a DCT process and a variable length code encoding process.

Although HDTV systems are being developed in various countries especially in Japan, the United States, and European countries, they differ from each other. In the HDTV system developed in Japan, the number of scanning lines is 1125 and the field frequency is 60 Hz. The HDTV system developed in Japan is hereinafter referred to as the Japanese HDTV system. In the Japanese HDTV system, MUSE system is employed. In the MUSE system, a HDTV signal is band-compressed and transmitted as an analog signal. This HDTV base band signal used in the Japanese HDTV system is hereinafter referred to as a (1125/60) HDTV signal.

In the HDTV system developed in the United States, ATV system is being studied. The HDTV system developed in the United States is hereinafter referred to as the American HDTV system. In the ATV system, the HDTV signal is processed and transmitted as a digital signal. In the American ATV system, the number of scanning lines will be 1050 and the field frequency will be 59.94 Hz. The HDTV base band signal, which will be used in the United States, is referred to as a (1050/60) HDTV signal.

In the HDTV system developed in European countries, HD-MAC system is being studied. In the HD-MAC system, the HDTV signal is planed to be compressed and transmitted as a analog signal. The HDTV system developed in European countries is referred to as the European HDTV system. In the European HD-MAC system, the number of scanning lines will be 1250 and the field frequency will be 50 Hz. The HDTV base band signal, which will be used in the European countries, is referred to as a (1250/50) HDTV signal.

Figure 1:
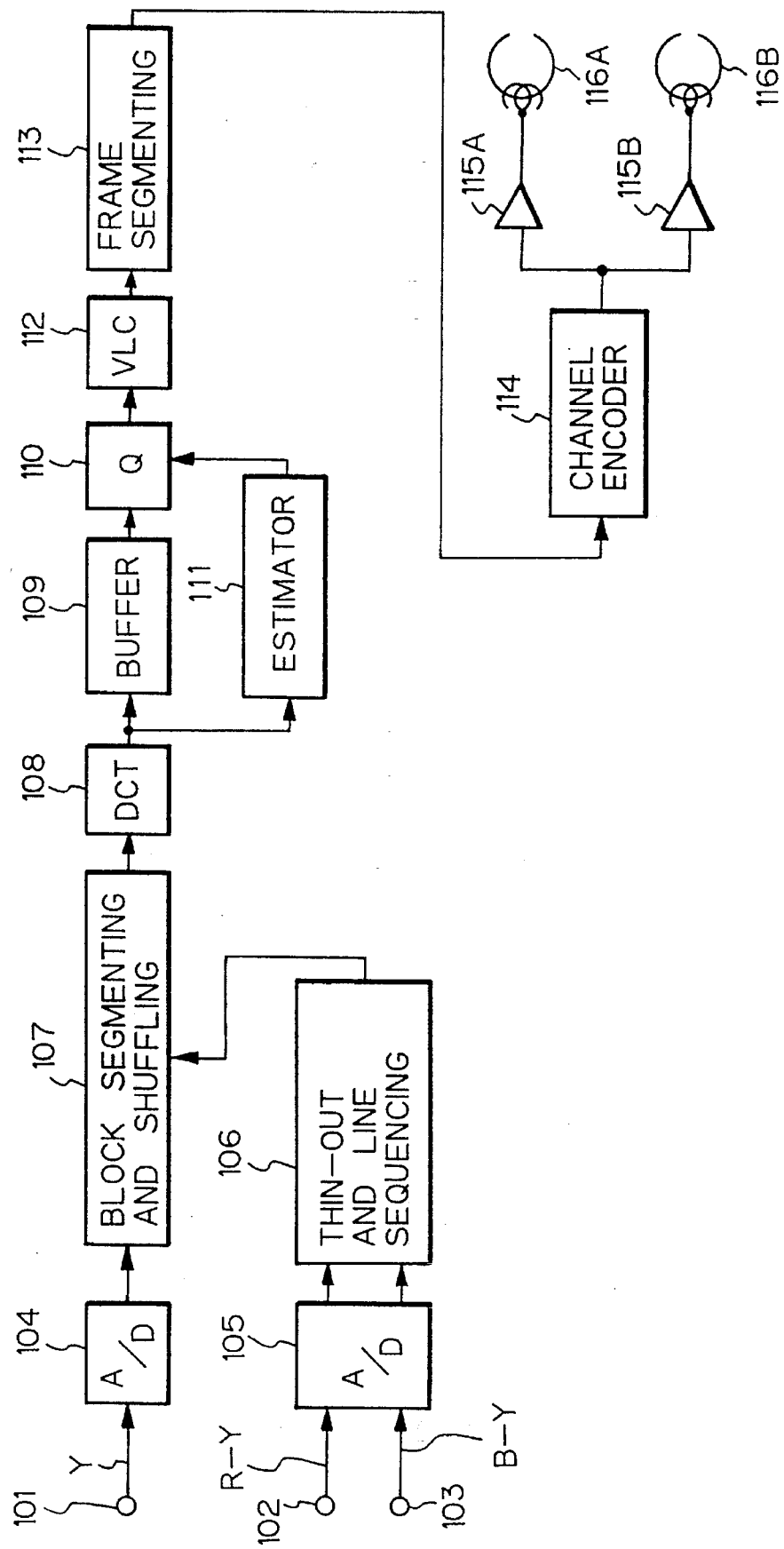
FIG. 1 is a block diagram showing a construction of a recording system of a conventional digital VCR.
Figure 2B:
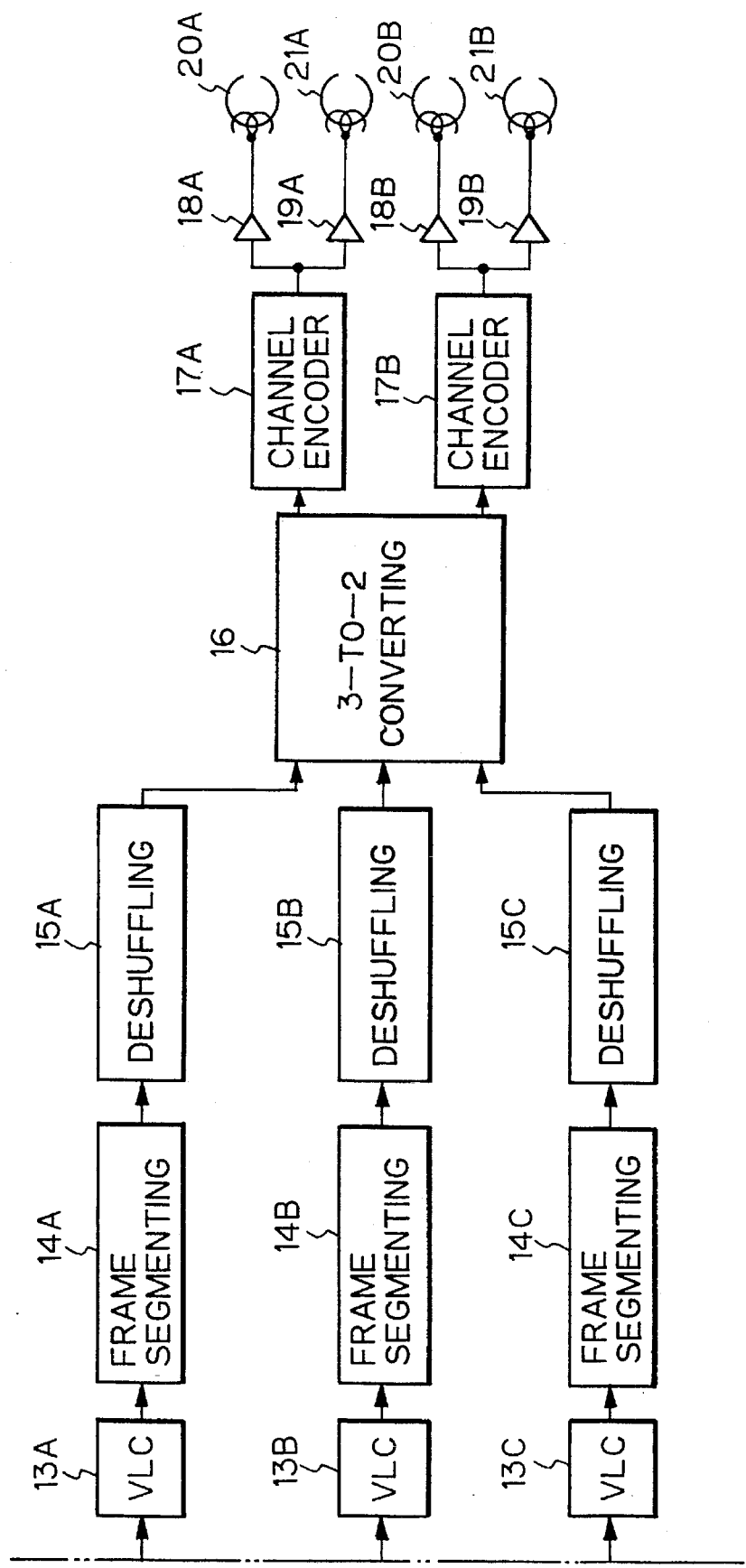

FIGS. 2A and 2B are block diagrams showing a construction of a recording system of a digital VCR according to the present invention. In FIGS. 2A and 2B, reference numeral 1 is an input terminal of a luminance signal Y according to an HDTV system. Reference numerals 2 and 3 are input terminals of color difference signals PR and PB corresponding to the HDTV system, respectively.

Reference numeral 4 is an A/D converter that converts the analog luminance signal into a digital signal. Reference numeral 5 is an A/D converter that converts the analog color difference signals PR and PB into respective digital signals. The luminance signal Y received from the input terminal 1 is supplied to the A/D converter 4. The A/D converter 4 converts the analog luminance signal into a digital signal. The color difference signals PR and PB received from the input terminals 2 and 3 are supplied to the A/D converter 5. The A/D converter 5 converts the color difference signals PR and PB into respective digital signals.

Reference numeral 6 is a thin-out and line sequencing circuit. The thin-out and line sequencing circuit 6 halves samples of the color difference signals PR and PB in a vertical direction and allocates the color difference signals PR and PB in line sequence. An output of the A/D converter 5 is supplied to the thin-out and line sequencing circuit 6.

Reference numeral 7 is a serial-to-parallel converting circuit. The serial-to-parallel converting circuit 7 divides each of the luminance signal Y received from the A/D converter 4 and the color difference signals PR and PB received from the thin-out and line sequencing circuit 6 into three coding paths CP-A, CP-B, and CP-C. Since the luminance signal Y and the color difference signals PR and PB are divided into the three coding paths CP-A, CP-B, and CP-C, the data transmission rate of the luminance signal Y, and the color difference signals PR and PB are decreased to ⅓ times the original data transmission rate.

Reference numerals 8A, 8B, and 8C are block segmenting and shuffling circuits that shuffle the received signals as macro-blocks. Each macro-block is composed of a predetermined number of DCT blocks of the luminance signal Y, and the color difference signals PR and PB. The shuffling operation is performed so as to equally compress the entire image.

Reference numerals 9A, 9B, and 9C are DCT circuits. Reference numerals 10A, 10B, and 10C are buffer circuits. Reference numerals 11A, 11B, and 11C are quantizing circuits. Reference numerals 12A, 12B, and 12C. are estimators. Outputs of the block segmenting and shuffling circuits 8A to 8C are supplied to the DCT circuits 9A to 9C, respectively. The DCT circuits 9A to 9C each transform sample data of a block with a time region (composed of eight pixels in the horizontal direction times eight pixels in the vertical direction) into data with a frequency range corresponding to DCT (two-dimensional discrete cosine transform) technique. The data transformed by the DCT circuits 9A to 9C are zigzag scanned and read and then supplied to both the buffers 10A to 10C and the estimators 12A to 12C, respectively.

The buffers 10A to 10C each have a fixed buffer amount. The buffer amount of the buffers 10A to 10C is a data amount equivalent to five sync blocks, which are the same as the buffer capacity of a signal of the conventional television system.

The estimators 12A to 12C each estimate the code amount of the fixed buffer amount of data that a particular quantizer quantizes into variable length code and selects an optimum quantizing table so that the fixed buffer amount becomes equal to or less than the predetermined code amount. The quantizers 11A to 11C each have various quantizing tables. The estimators 12A to 12C each select a quantizing table so that the total code amount of the buffer unit is equal to or less than the predetermined amount. The DCT data stored in the buffers 10A to 10C are quantized by the quantizers 11A to 11C, respectively.

Reference numeral 13A to 13C are variable length code encoding circuits. The variable length code encoding circuits each encode quantized data into variable length code such as two-dimensional Huffman code.

Reference numerals 14A to 14C are frame segmenting circuits. The frame segmenting circuits 14A to 14C each place a predetermined pattern sync at the beginning of record data and perform error correction encoding process so as to develop the record data into frames. Outputs of the variable length encoding circuits 13A to 13C are developed into frames by the frame segmenting circuits 14A to 14C.

Reference numerals 15A, 15B, and 15C are deshuffling circuits. The deshuffling circuits 15A, 15B, and 15C each deshuffle the sync blocks.

Reference numeral 16 is a 3-channel-to-2-channel converting circuit. The 3-channel-to-2-channel converting circuit 16 receives frames from the three coding paths CP-A, CP-B, and CP-C and converts the data with three coding paths into data with two channels.

Outputs of the 3-channel-to-2-channel converting circuit 16 are supplied to channel encoders 17A and 17B. The channel encoders 17A and 17B modulate the outputs of the outputs of the 3-channel-to-2-channel converting circuit 16 corresponding to a predetermined modulating system. An output of the channel encoder 17A is supplied to rotating heads 20A and 21A through recording amplifiers 18A and 19A. An output of the channel encoder 17B is supplied to rotating heads 20B and 21B through recording amplifiers 18B and 19B.

Figure 3:
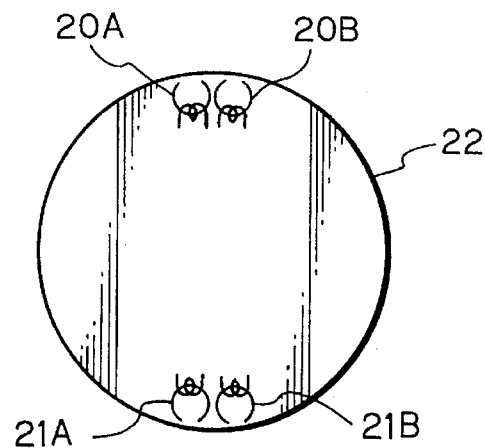
FIG. 3 is a plan view showing a layout of heads of the digital VCR that record a HDTV signal.

As shown in FIG. 3, the rotating heads 20A and 20B are adjacently disposed in double azimuth head construction. Likewise, the rotating heads 21A and 21B are adjacently disposed in double azimuth head construction. The rotating heads 20A and 20B are opposed to the rotating heads 21A and 21B, respectively. The azimuth angle of the rotating head 20A differs from the azimuth angle of the rotating head 21A. The azimuth angle of the rotating head 20B differs from the azimuth angle of the rotating head 21B. The rotating heads 20A, 20B, 21A, and 21B record compressed video signals on a magnetic tape (not shown).

The rotating drum 22 is rotated at 150 Hz. The magnetic tape is run at a speed twice as high as a magnetic tape of the conventional television system. When a (1125/60) HDTV signal and a (1050/60) HDTV signal, whose field frequency is 60 Hz, are recorded, the number of tracks per frame is 20. When a (1250/50) HDTV signal, whose field frequency is 50 Hz, is recorded, the number of tracks per frame is 24.

Figure 4:
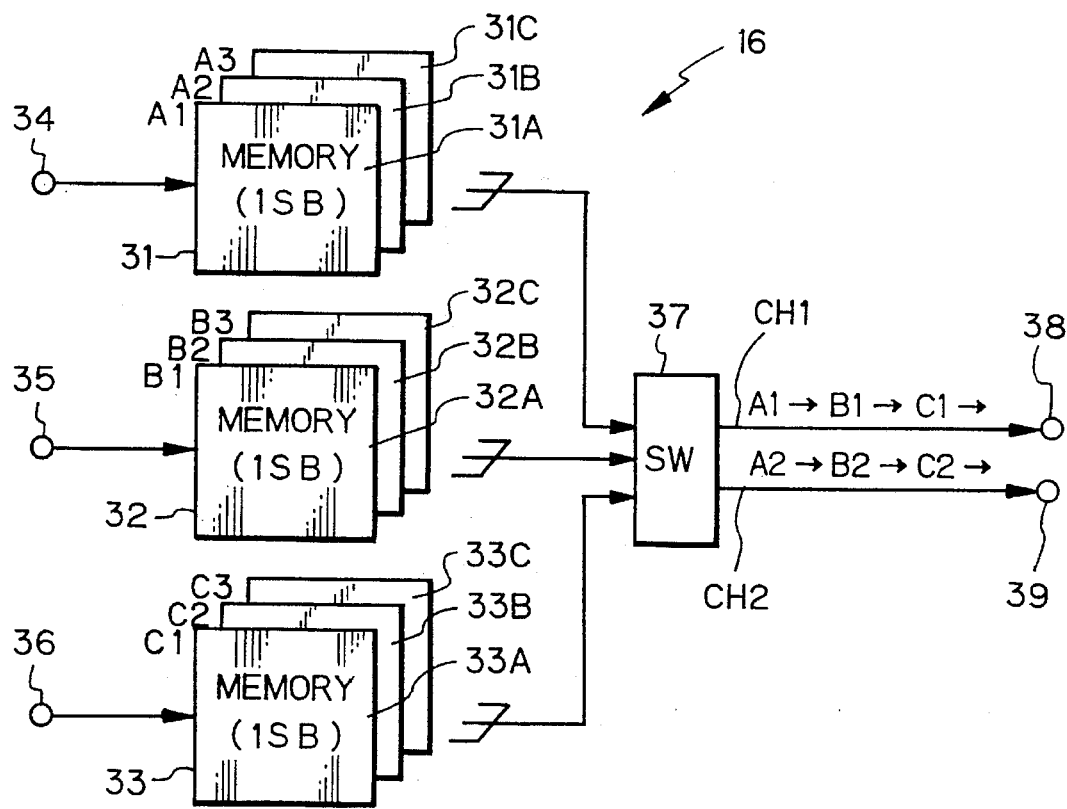
FIG. 4 is a block diagram showing an example of a 3-channel-to-2-channel converting circuit.

FIG. 4 is a schematic diagram showing a construction of the 3-channel-to-2-channel converting circuit 16, which converts a three-parallel process into a two-parallel process. In FIG. 4, reference numerals 31, 32, and 33 are memories. The memories 31, 32, and 33 each store data of three sync blocks. The memories 31, 32, and 33 receive signals that are encoded through the three coding paths CP-A, CP-B, and CP-C from input terminals 34, 35, and 36, respectively.

Reference numeral 37 is a switch circuit. The switch circuit 37 receives outputs of the memories 31, 32, and 33. The switch circuit 37 receives an RF switching pulse. The outputs of the memories 31, 32, and 33 are successively switched corresponding to the RF switching pulse. The switch circuit 37 converts the signals of the three coding paths CP-A, CP-B, and CP-C into signals with two channels CH1 and CH2. Outputs of the channels CH1 and CH2 are output from output terminals 38 and 39, respectively.

The memories 31, 32, and 33 each store data of three sync blocks. The memory 31 is constructed of three memory areas 31A, 31B, and 31C, each of which stores data of one sync block. The memory 32 is constructed of three memory areas 32A, 32B, and 32C, each of which stores data of one sync block. The memory 33 is constructed of three memory areas 33A, 33B, and 33C, each of which stores data of one sync block.

The memory areas 31A, 31B, and 31C of the memory 31 store data of sync blocks A1, A2, A3, and so forth encoded through the coding channel CP-A. The memory areas 32A, 32B, and 32C of the memory 32 store data of sync blocks B1, B2, B3, and so forth encoded through the coding channel CP-B. The memory areas 33A, 33B, and 33C of the memory 33 store data of sync blocks C1, C2, C3, and so forth encoded through the coding channel CP-C.

The switch circuit 37 successively outputs sync blocks A1, B1, C1, and so forth to the channel CH1 and sync blocks A2, B2, C2, and so forth to the channel CH2. The signal of the channel CH1 is supplied to the rotating heads 20A and 21A. The signal of the channel CH2 is supplied to the rotating heads 20B and 21B. As described above, the azimuth angle of the rotating head 20A differs from the azimuth angle of the rotating head 21A. Likewise, the azimuth angle of the rotating head 20B differs from the azimuth angle of the rotating head 21B.

Figure 5:
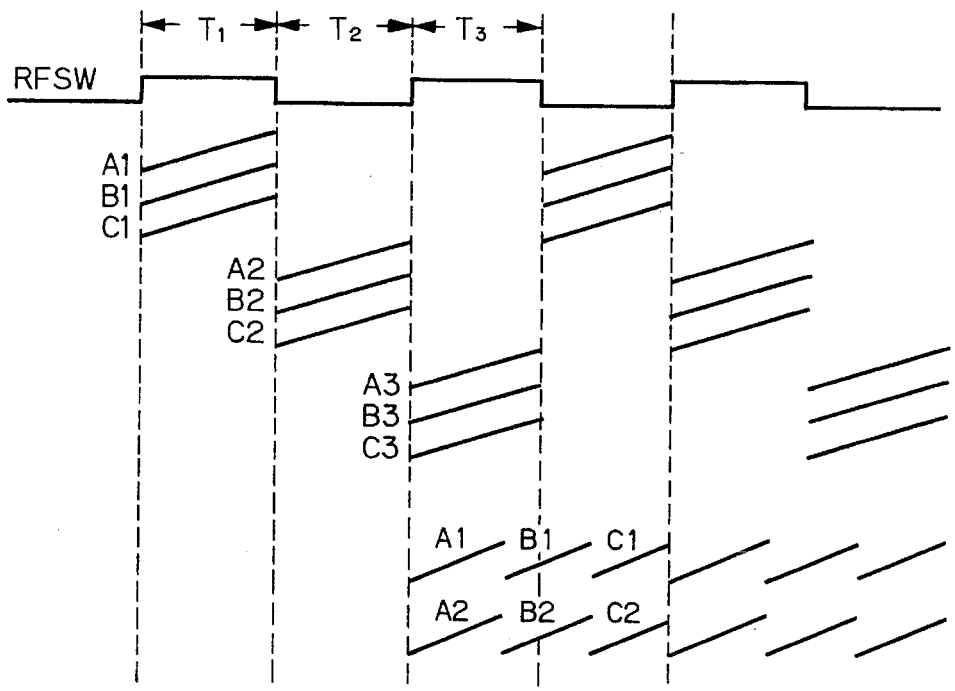
FIG. 5 is a block diagram for explaining the operation of the 3-channel-to-2-channel converting circuit.

As shown in FIG. 5, in period $T_1$, compressed data of sync blocks A1, B1, and C1 are stored in the memory areas 31A, 32A, and 33A of the memories 31, 32, and 33, respectively. In period $T_2$, compressed data of sync blocks A2, B2, and C2 are stored in the memory areas 31B, 32B, and 33B of the memories 31, 32, and 33, respectively. In period $T_3$, compressed data of sync blocks A3, B3, and C3 are stored in the memory areas 31C, 32C, and 33C of the memories 31, 32, and 33, respectively.

In addition, in the period $T_3$, compressed data of sync blocks A1 and A2 are output to the channels CH1 and CH2, respectively. Next, compressed data of sync blocks B1 and B2 are output to the channels CH1 and CH2, respectively. Thereafter, compressed data of sync blocks C1 and C2 are output to the channels CH1 and CH2, respectively.

Figure 6:
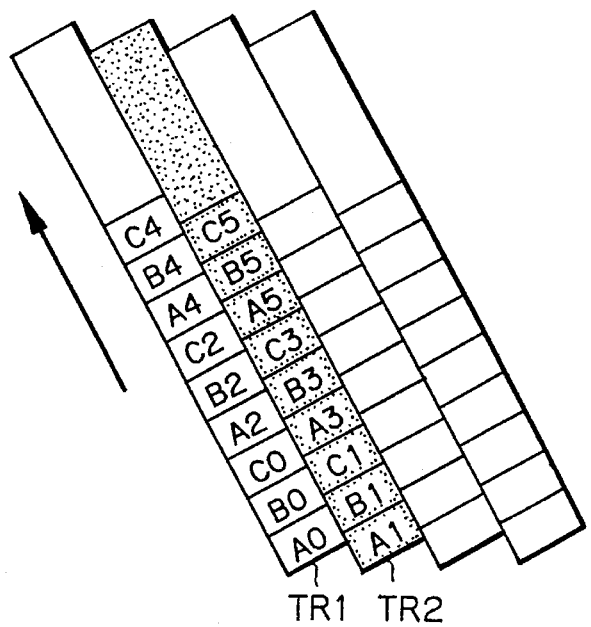
FIGS. 6 and 7 are schematic diagrams for explaining the relation of a track pattern on a magnetic tape and positions of sync blocks on a screen.
Figure 7:
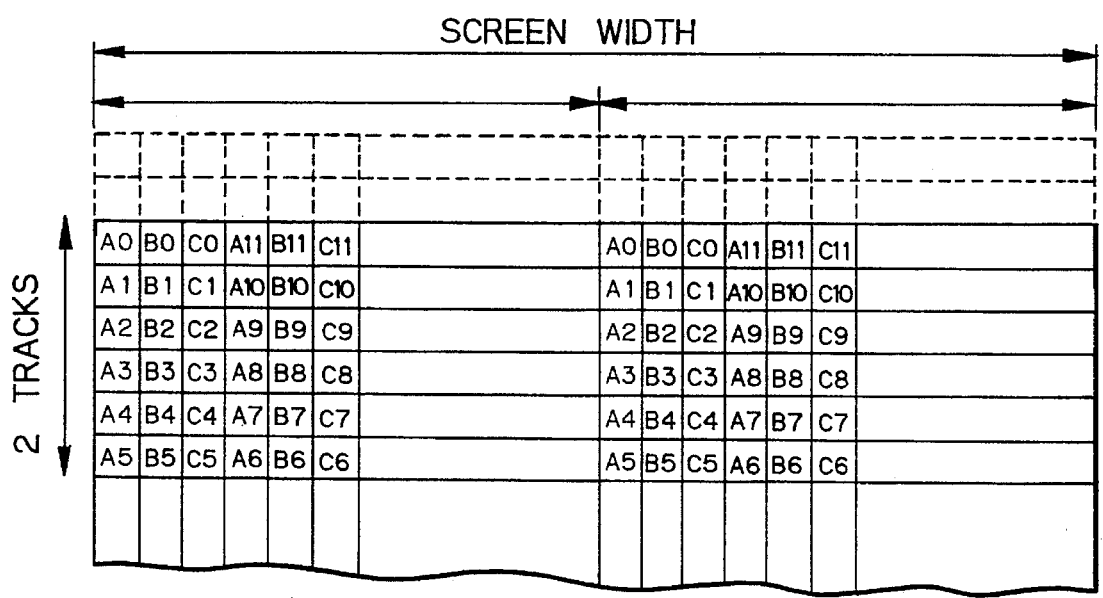

Since the azimuth angle of the head 20A differs from the azimuth angle of the head 21A and the azimuth angle of the head 20B differs from the azimuth angle of the head 21B, the outputs of the channels CH1 and CH2 are recorded at the same time. FIG. 6 shows a track pattern of sync blocks of a (1125/60) HDTV signal recorded on a magnetic tape. In FIG. 6, a track TR1 represents a track pattern of sync blocks on the channel CH1 recorded by the heads 20A and 21A. A track TR2 represents a track pattern of sync blocks on the channel CH2 recorded by the heads 20B and 21B. FIG. 7 shows positions of sync blocks on a screen. In FIG. 7, non-hatched sync blocks are recorded on the channel CH1, whereas hatched sync blocks are recorded on the channel CH2.

Figure 8:
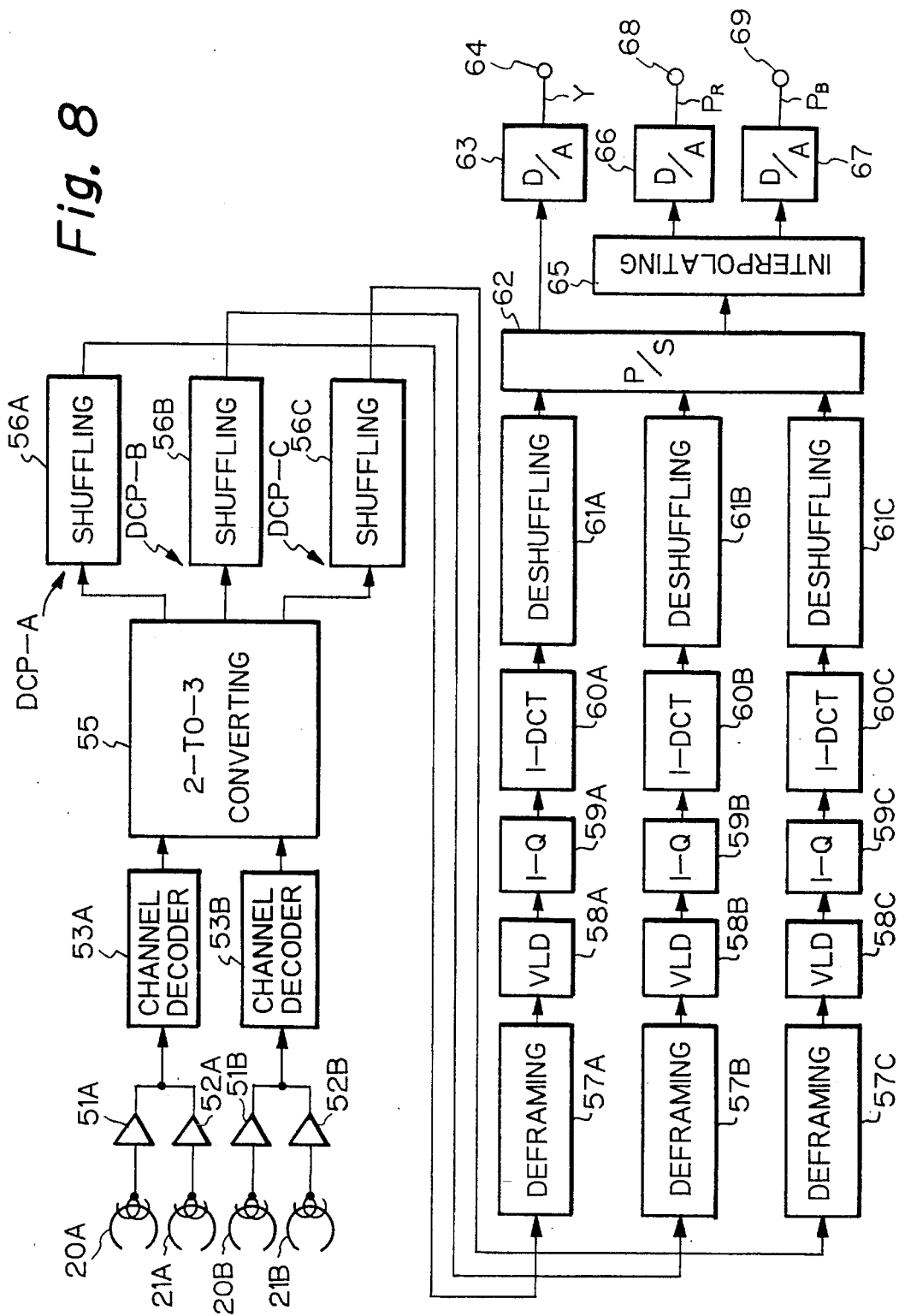
FIG. 8 is a block diagram showing a construction of a reproducing system of the digital VCR according to the present invention.

FIG. 8 is a block diagram showing a construction of a reproducing system of a digital VCR according to the present invention. In FIG. 8, signals reproduced by rotating heads 20A, 20B, 21A, and 21B are supplied to channel decoders 53A and 53B through reproducing amplifiers 51A, 51B, 52A, and 52B. The channel decoders 53A and 53B demodulate reproduced signals corresponding to the modulating system of the channel encoders 17A and 17B in the recording system.

Reference numeral 55 is a 2-channel-to-3-channel converting circuit. The 2-channel-to-3-channel converting circuit 55 receives outputs of the channel decoders 53A and 53B. The 2-channel-to-3-channel converting circuit 55 divides reproduced outputs with the channels CH1 and CH2 into three decoding paths DCP-A, DCP-B, and DCP-C.

Reference numerals 56A, 56B, and 56C are shuffling circuits. The shuffling circuits 56A, 56B, and 56C accord with the deshuffling circuits 15A, 15B, and 15C of the recording system, respectively.

Reference numerals 57A, 57B, and 57C are deframing circuits. The deframing circuits 57A, 57B, and 57C accord with the frame segmenting circuits 14A, 14B, 14C of the recording system. Outputs of the shuffling circuits 56A, 56B, and 56C are supplied to the deframing circuits 57A, 57B, and 57C, respectively. The deframing circuits 57A, 57B, and 57C decompress frame data and perform error correction process.

Reference numerals 58A, 58B, and 58C are variable length code decoding circuits. Reference numerals 59A, 59B, and 59C are inverse-quantizers. Reference numerals 60A, 60B, and 60C are inverse-DCT circuits. Outputs of variable length code decoding circuits 58A, 58B, and 58C are supplied to the inverse-quantizers 59A, 59B, and 59C, respectively. Outputs of the inverse-quantizers 59A, 59B, and 59C are supplied to the inverse-DCT circuits 60A, 60B, and 60C, respectively.

The variable length code decoding circuits 58A, 58B, and 58C decode two-dimensional Huffman code. Thus, the variable length code decoding circuits 58A, 58B, and 58C accord with the variable length code encoding circuits 13A, 13B, and 13C, respectively. The inverse-quantizers 59A, 59B, and 59C accord with the quantizers 11A, 11B, and 11C of the recording system. The inverse-quantizers 59A, 59B, and 59C perform inverse-quantizing operation. The inverse-DCT circuits 60A, 60B, and 60C accord with the DCT circuits 9A, 9B, and 9C of the recording system. The inverse-DCT circuits 60A, 60B, and 60C convert digital video signals with a frequency range into digital video signals with a time range.

Reference numerals 61A, 61B, and 61C are deshuffling circuits. Outputs of the inverse-DCT circuits 60A, 60B, and 60C are supplied to the deshuffling circuits 61A, 61B, and 61C. The deshuffling circuits 61A, 61B, and 61C accord with the shuffling circuits 8A, 8B, and 8C of the recording system. The deshuffling circuits 61A, 61B, and 61C reallocate data as macro-blocks.

Reference numeral 62 is a parallel-to-serial converting circuit. The parallel-to-serial converting circuit 62 combines decoded data of the three decoding paths DCP-A, DCP-B, and DCP-C into one screen of one path. Outputs of the deshuffling circuits 61A, 61B, and 61C are supplied to the parallel-to-serial converting circuit 62. The parallel-to-serial converting circuit 62 output the digital luminance signal Y, and the digital color difference signals PR and PB that are allocated in line sequence.

The digital luminance signal Y is supplied to a D/A converter 63. The D/A converter 63 converts the digital luminance signal into an analog luminance signal. The analog luminance signal is output from an output terminal 64.

The line-sequenced digital color difference signals PR and PB are supplied to an interpolating circuit 65. The interpolating circuit 65 extracts two digital color difference signals PR and PB from the line-sequenced color difference signals. The digital color difference signals PR and PB are supplied to D/A converters 66 and 67, respectively. The D/A converters 66 and 67 convert the digital color difference signals PR and PB into analog color difference signals PR and PB, respectively. The analog color difference signals are output from output terminals 68 and 69, respectively.

Figure 9:
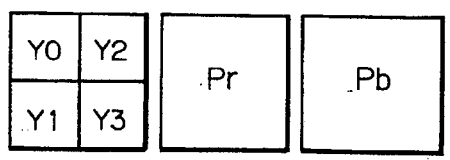
FIG. 9 is a schematic diagram showing a composition of a macro-block.

Next, the dividing operation and shuffling operation of HDTV signals corresponding to Japanese HDTV system, American HDTV system, and European HDTV system will be described in detail. In the following examples, the luminance signal received from the input terminal 1 is converted into a digital signal with a sampling frequency of 40.5 MHz by the A/D converter 4. The color difference signals PR and PB received from the input terminal 2 are converted into digital signals with a sampling frequency of 20.25 MHz by the A/D converter 5. In other words, the relation of the sampling frequencies the luminance signal, and the color difference signals PR and PB is (12:6:0). The information amount of the color difference signals PR and PB is halved by the thin-out and line sequencing circuit 6. Thus, the information amount of each of the color difference signals PR and PB becomes ¼ times the information amount of the luminance signal Y. As shown in FIG. 9, one macro-block is composed of four DCT blocks of the luminance signal, one DCT block of the color difference signal PR, and one DCT block of the color difference signal PB. The luminance signal, and the color difference signals PR and PB are shuffled with the macro-blocks.

Figure 10:
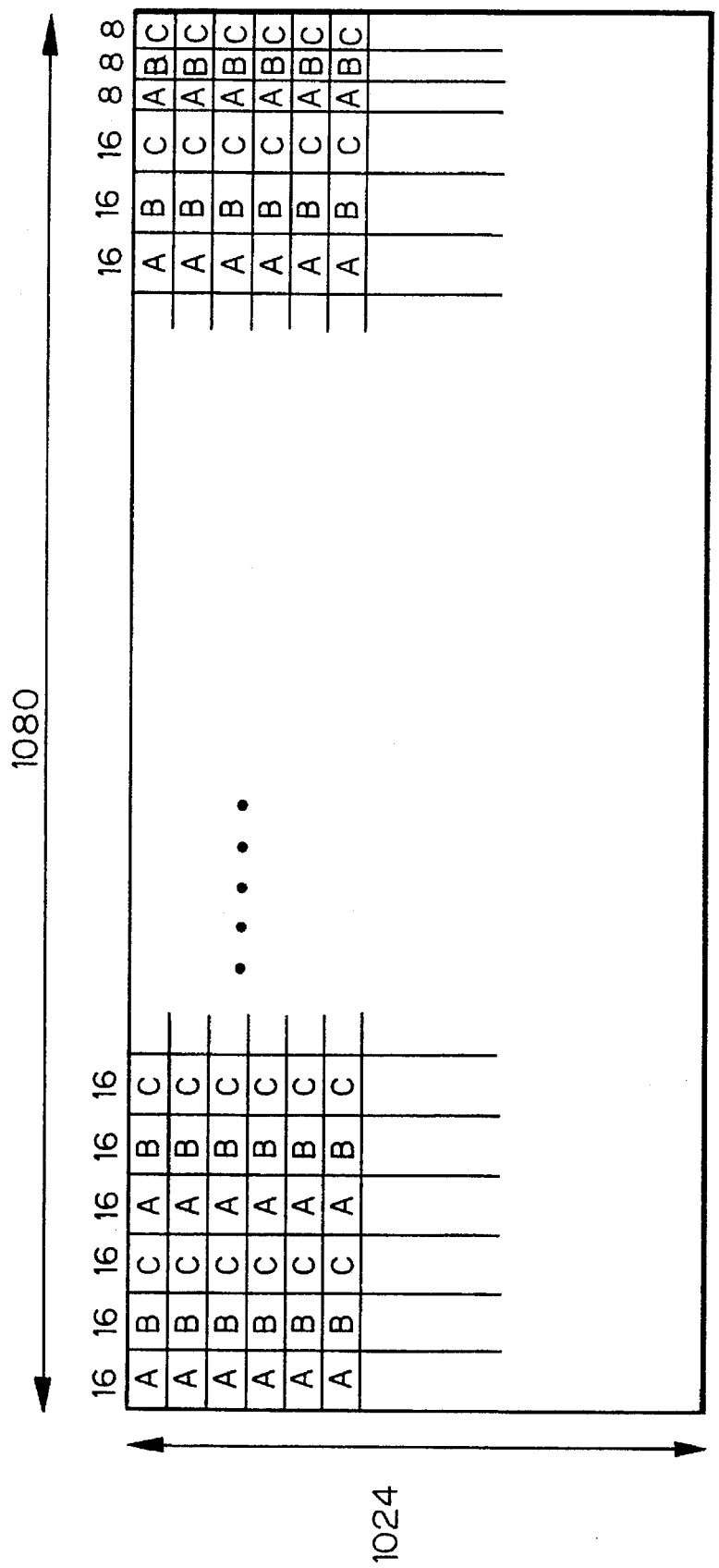

Next, an example of the recording operation of a HDTV signal corresponding to the Japanese HDTV system will be described. As shown in FIG. 10, in this example, the number of valid samples per line is 1080 and the number of valid lines per frame is 1024. As shown in FIG. 9, one macro-block is composed of four DCT blocks Y0, Y1, Y2, and Y3 of the luminance signal, one DCT block of the corresponding color difference signal Pr, and one DCT block of the corresponding color difference signal Pb. One DCT block is composed of eight pixels in the vertical direction times eight pixels in the horizontal direction. Thus, the number of macro-blocks per frame is as follows:

1080/16=67.5

1024/16=64

Thus, in the case of the (1125/60) HDTV signal, the number of macro-blocks per frame is (67.5×64).

Figure 11A:
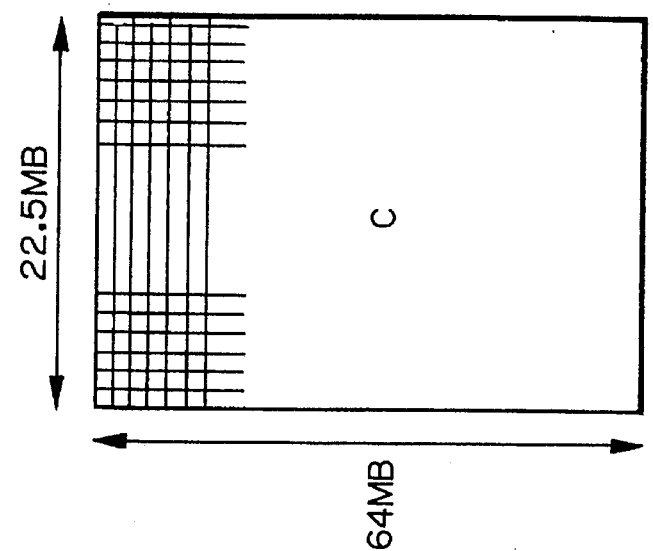
Figure 11B:
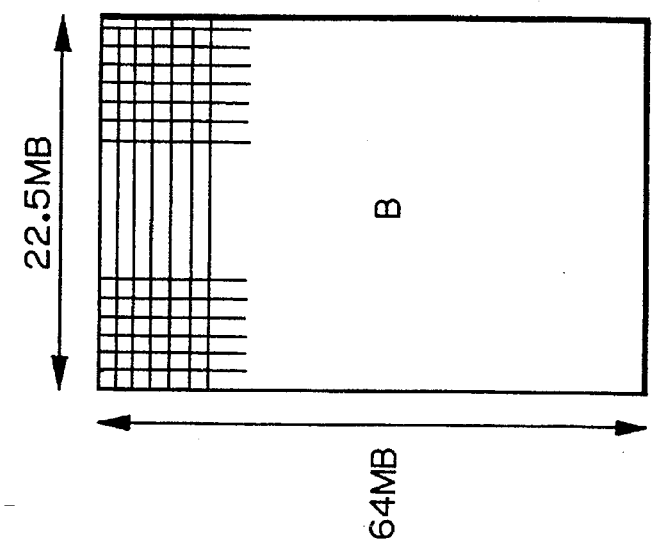
Figure 11C:
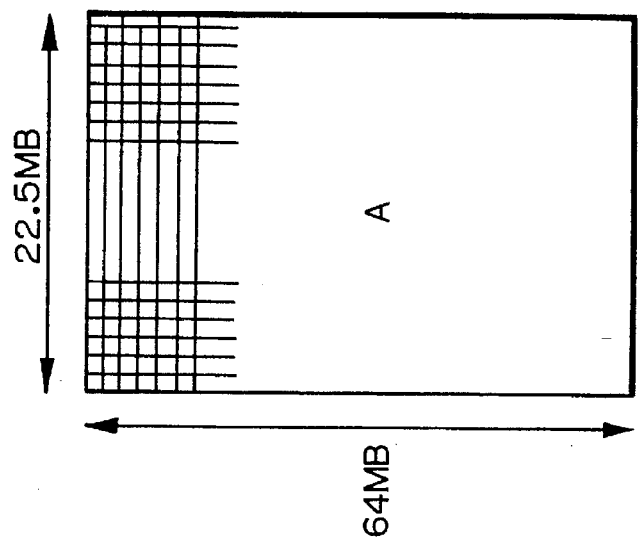

Thus, the (67.5×64) macro-blocks are divided into the three coding paths CP-A, CP-B, and CP-C. FIG. 11A shows a sub screen of the coding path CP-A. FIG. 11B shows a sub screen of the coding path CP-B. FIG. 11C shows a sub screen of the coding path CP-C. In FIG. 10, "A", "B", and "C" represent portions processed on the coding paths CP-A, CP-B, and CP-C, respectively.

In the (1125/60) HDTV signal, the number of tracks per frame is 20. As described above, when the conventional television signal is recorded, 135 sync blocks are placed per track. To commonly use the recording operation of the conventional television signal, the (1125/60) HDTV signal is recorded so that the number of sync blocks per track is 135. On the other hand, the conventional television signal is recorded so that the fixed buffer amount is five sync blocks.

To cause the buffer amount to be five sync blocks and 135 sync blocks to be recorded on one track, it is necessary to determine the number of macro-blocks contained in five sync blocks, which are the buffer amount.

In the (1125/60) HDTV signal, the number of tracks per frame is 20. The number of macro-blocks per frame is as follows.

64×67.5=4320

Thus, the number of macro-blocks per track is as follows.

4320/20=216

Since the number of sync blocks per track is 135 and the number of macro-blocks per track is 216, the number of macro-blocks contained in five sync blocks is eight. Thus, in the (1125/60) HDTV signal, eight macro-blocks are required for every five sync blocks.

In the example of the recording operation of the (1125/60) HDTV signal, the shuffling operation is performed by the block segmenting and shuffling circuits 8A, 8B, and 8C so that eight macro-blocks are collected for every five sync blocks. Next, the shuffling operation will be described.

Figure 12:
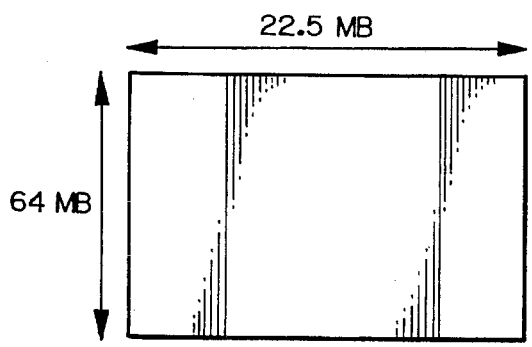
Figure 13:
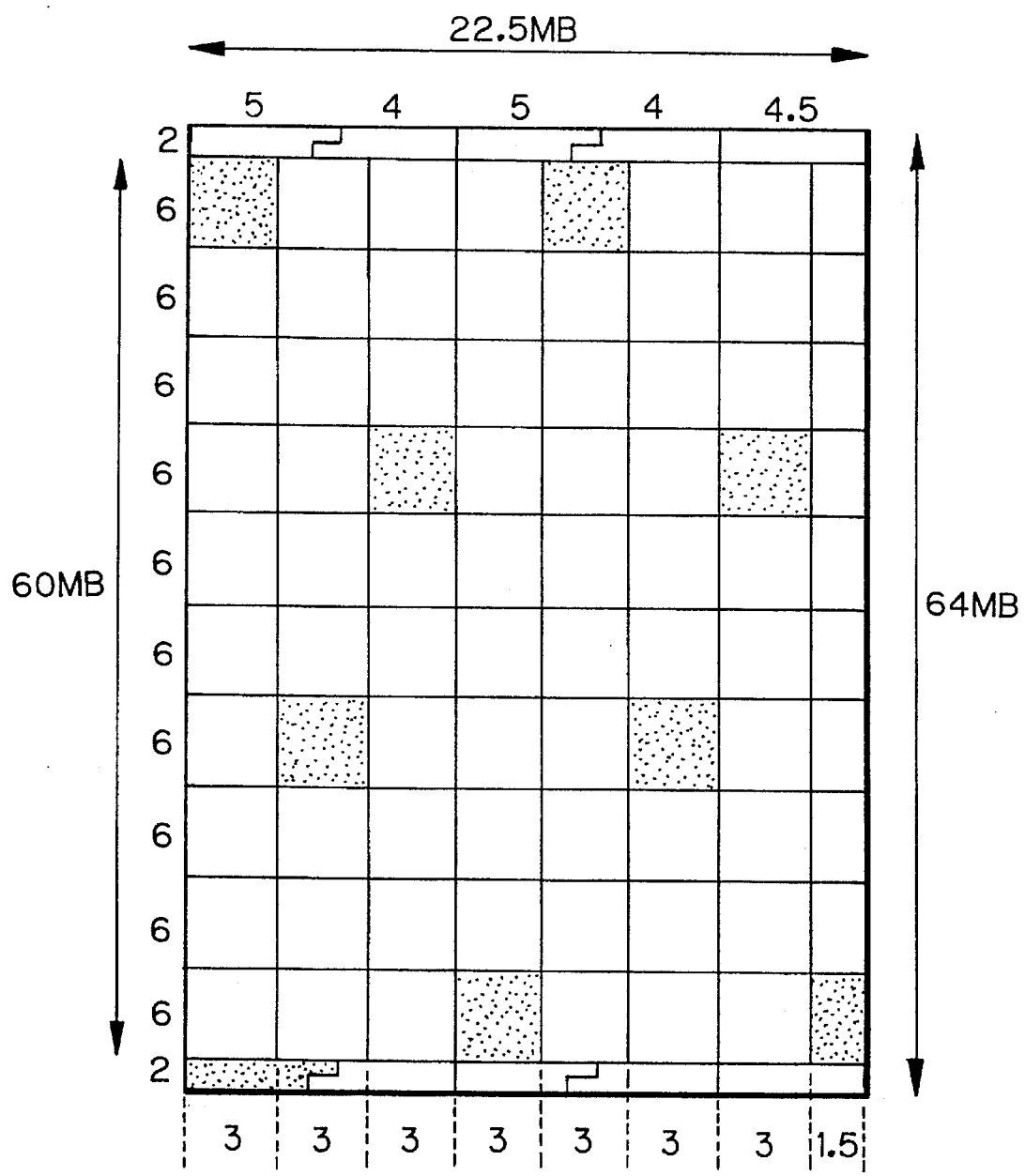
Figures 14, 16:
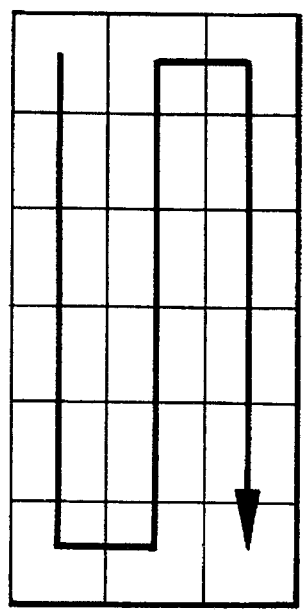
Figures 15A, 15B, 15C, 15D:
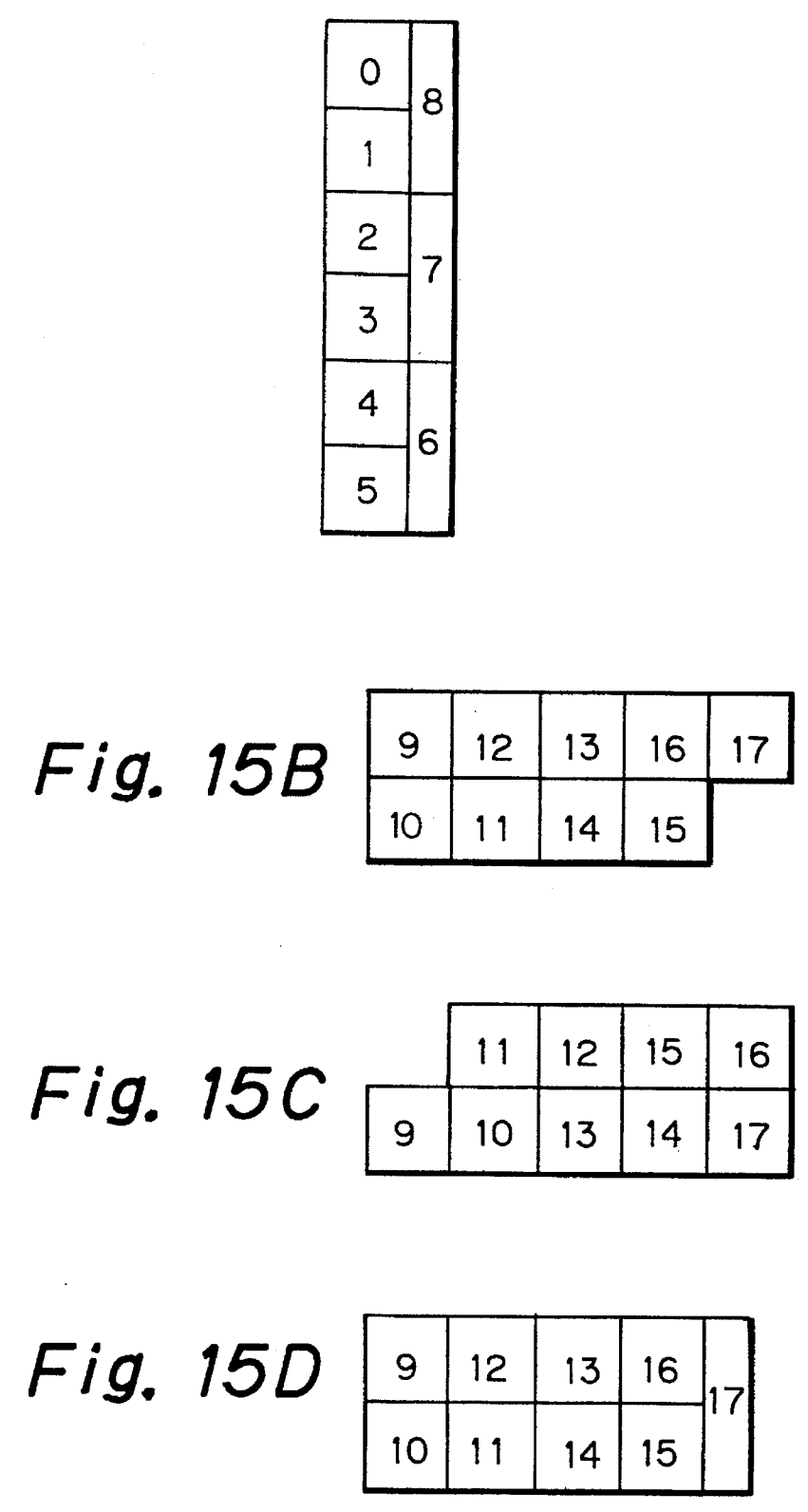

In the (1125/60) HDTV signal, the number of macro-blocks is (67.5×64). When these macro-blocks are processed in parallel on the three coding paths CP-A, CP-B, and CP-C, as shown in FIG. 12, one sub screen is composed of (22.5×64) macro-blocks. As shown in FIG. 13, the sub screen is divided into 10 portions in vertical direction and eight portions in horizontal direction. Thus, super macro-blocks are formed as represented by hatched lines. As shown in FIG. 14, one super macro-block is composed of 18 macro-blocks. Super macro-blocks at the right end of the screen and areas at the top and bottom are combined so as to form one super macro-block. In other words, as shown in FIG. 15, by combining the right end (FIG. 15A) and the areas at the top and bottom of the screen (FIG. 15B, 15C, or 15D), the super macro-block is formed. Thus, three types of areas are formed at the top and bottom of the screen as shown in FIGS. 15B, 15C, or 15D.

Figure 17:
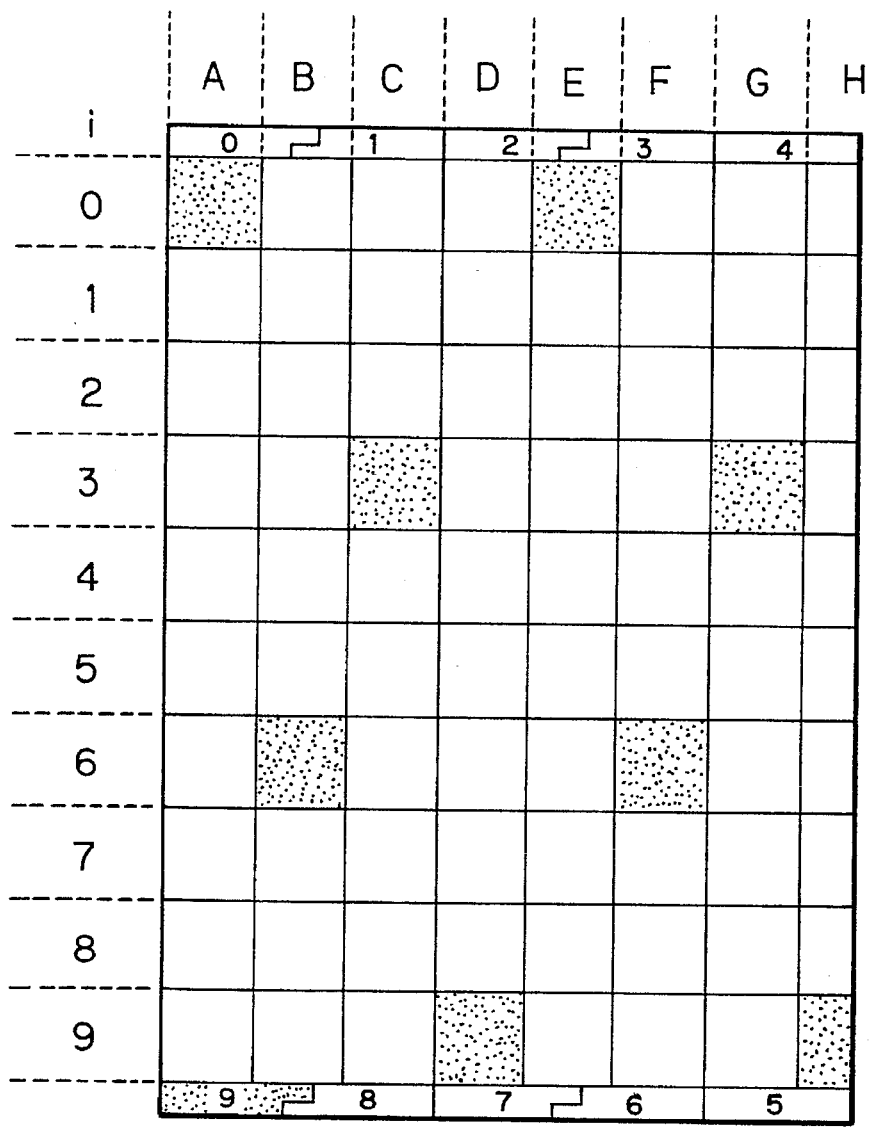

When macro-blocks are shuffled, one macro-block is collected from each of the super macro-blocks in the order of the arrow of FIG. 16. In addition, macro-blocks are collected from the merged super macro-block in the order shown in FIG. 15. Thus, one macro-block is collected from each of the eight super macro-blocks. The number of macro-blocks collected from the super macro-blocks is fixed to eight. FIG. 17 shows the relation between the fixed eight macro-blocks and sync blocks.

As shown in FIG. 18, the frame segmenting circuits 14A, 14B, and 14C each develop data of eight macro-blocks contained in five sync blocks into frames. As shown in FIG. 18, a fixed pattern sync S is placed at the beginning of each sync block. The sync S is followed by ID data ID and quantizing table number QNO, followed by luminance signal data Y, and color difference signal data Pr and Pb, followed by a parity.

Next, an example of the recording operation of a HDTV signal corresponding to the American HDTV system will be described. In this example, the number of valid samples per line is 1080 and the number of valid lines per frame is 960. As shown in FIG. 9, one macro-block is composed of four DCT blocks Y0, Y1, Y2, and Y3 of the luminance signal, one DCT block of the corresponding color difference signal Pr, and one DCT block of the corresponding color difference signal Pb. Thus, the number of macro-blocks per frame is as follows:

1080/16=67.5

960/16=60

Thus, in the case of the (1050/60) HDTV signal, the number of macro-blocks per frame is (67.5×60).

In the (1150/60) HDTV signal, the number of tracks per frame is 20. When the conventional television signal is recorded, 135 sync blocks are placed per track. To commonly use the recording operation of the conventional television signal, the (1050/60) HDTV signal is recorded so that the number of sync blocks per track is 135. On the other hand, the conventional television signal is recorded so that the fixed buffer amount is five sync blocks.

To cause the buffer amount to be five sync blocks and 135 sync blocks to be recorded on one track, it is necessary to determine the number of macro-blocks contained in five sync blocks, which are the buffer amount.

In the (1050/60) HDTV signal, the number of tracks per frame is 20. The number of macro-blocks per frame is as follows.

60×67.5=4050

Thus, the number of macro-blocks per track is as follows.

4050/20=202.5

Since the number of sync blocks per track is 135 and the number of macro-blocks per track is 202.5, the number of macro-blocks contained in five sync blocks is 7.5. Thus, in the (1050/60) HDTV signal, 7.5 macro-blocks are required for every five sync blocks.

In the (1050/60) HDTV signal, the shuffling operation is performed by the block segmenting and shuffling circuits 8A, 8B, and 8C so that 7.5 macro-blocks are collected for every five sync blocks. Next, the shuffling operation will be described.

Figure 19:
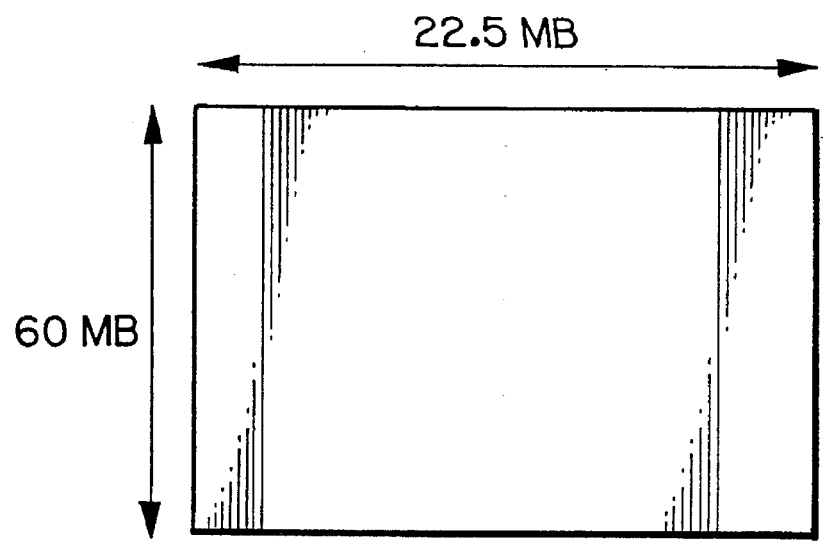
Figure 20A:
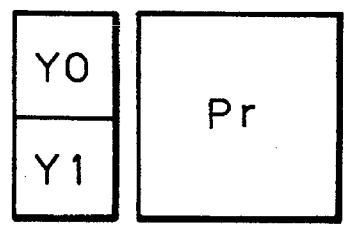
FIGS. 20A and 20B are schematic diagrams showing examples of compositions of half macro-blocks.
Figure 20B:
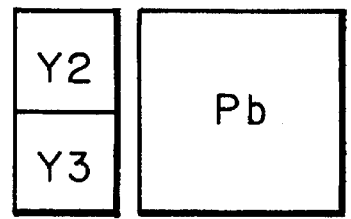
Figure 21:
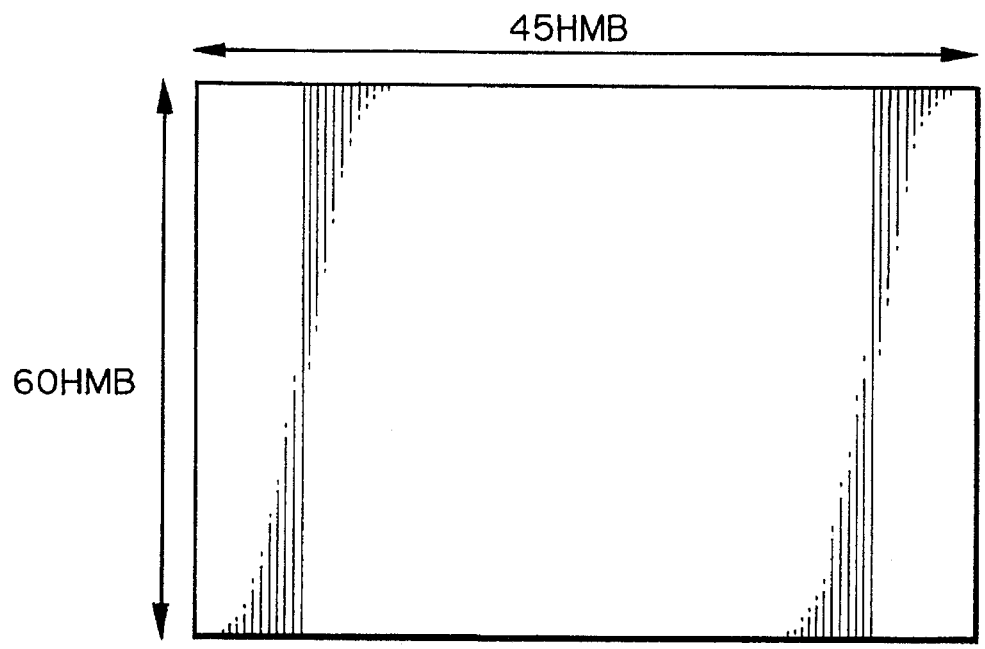
Figure 22:
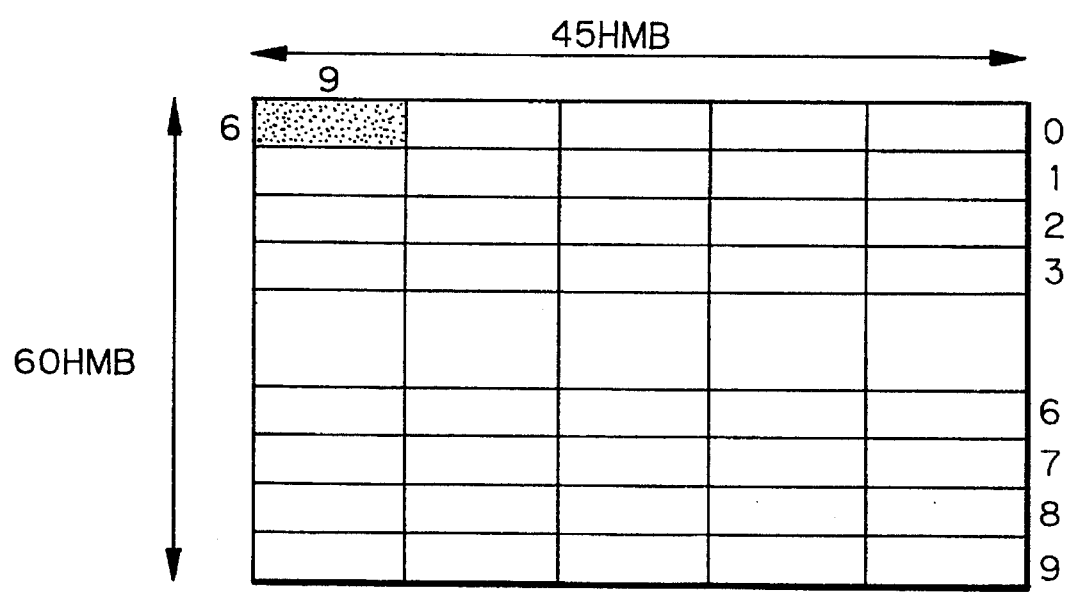

In the (1050/60) HDTV signal, the number of macro-blocks is (67.5×60). When these macro-blocks are divided into three sub screens, as shown in FIG. 19, one sub screen is composed of 22.5×60 (macro-blocks). Since the number of sync blocks contained in five sync blocks is fixed to 7.5. Thus, as shown in FIG. 20, the half of one macro-block is referred to as a half macro-block. As shown in FIGS. 20A and 20B, there are two types of half macro-blocks. As shown in FIG. 21, one sub screen is composed of (45×60) half macro-blocks. As shown in FIG. 22, when the sub screen is divided into 10 portions in vertical direction and five portions in horizontal direction, 50 areas are formed, each of which is referred to as a super macro-block. Three half macro-blocks are collected from each of five super macro-blocks that are hatched in FIG. 23.

3 × 5 = 15 half macro-blocks
= 7.5 macro-blocks

In other words, the number of macro-blocks being shuffled is fixed to 7.5. As shown in FIGS. 24A and 24B, each super macro-block is composed of 54 half macro-blocks. As shown in FIGS. 24C and 24D, the 54 half macro-blocks are allocated. On each coding path, 54×5=270 half macro-blocks =135 macro-blocks are collected.

Thus, 270×3=810 half macro-blocks=405 macro-blocks/screen are recorded on two tracks (135×2=270 sync blocks). In other words, 405 macro-blocks/270 sync blocks=1.5×5= 7.5 macro-blocks/sync blocks (5 sync blocks).

The super macro-blocks that are hatched in FIG. 23 represent a shuffling pattern. Three half macro-blocks (1.5 macro blocks) are successively collected from each of the super macro-blocks corresponding to one of two patterns shown in FIGS. 24A and 24B so that the half macro-blocks collected from the super macro-blocks are connected on the screen.

As shown in FIG. 25, the frame segmenting circuits 14A, 14B, and 14C each develop 7.5 macro-blocks contained in five sync blocks into frames.

Next, an example of the recording operation of a HDTV signal corresponding to the European HDTV system will be described. When the (1250/50) HDTV signal is recorded, the number of valid samples per line is 1080 and the number of valid lines per frame is 1152. As shown in FIG. 9, one macro-block is composed of four DCT blocks Y0, Y1, Y2, and Y3 of the luminance signal, one DCT block of the corresponding color difference signal Pr, and one DCT block of the corresponding color difference signal Pb. The number of macro-blocks per frame is as follows:

1080/16=67.5

1152/16=72

Thus, the number of macro-blocks per frame is (67.5×72).

In the HDTV signal, the number of tracks per frame is 24. When the conventional television signal is recorded, 135 sync blocks are placed per track. To commonly use the recording operation of the conventional television signal, the (1250/50) HDTV signal is recorded so that the number of sync blocks per track is 135. On the other hand, the conventional television signal is recorded so that the fixed buffer amount is five sync blocks.

To cause the buffer amount to be five sync blocks and 135 sync blocks to be recorded on one track, it is necessary to determine the number of macro-blocks contained in five sync blocks, which are the buffer amount.

In the (1250/50) HDTV signal, the number of tracks per frame is 24. The number of macro-blocks per frame is as follows.

72×67.5=4860

Thus, the number of macro-blocks per track is as follows.

4860/24=202.5

Since the number of sync blocks per track is 135 and the number of macro-blocks per track is 202.5, the number of macro-blocks contained in five sync blocks is 7.5. Thus, in the (1250/50) HDTV signal, 7.5 macro-blocks are required for every five sync blocks.

However, when the (1250/50) HDTV signal is recorded, one sub screen is composed of 45×72 (half macro-blocks). In the (1050/60) HDTV signal, a sub screen is divided into ten portions. However, in the (1250/50) HDTV signal, as shown in FIG. 26, a sub screen is divided into 12 portions in vertical direction.

As described above, in the (1125/60) HDTV signal, eight macro-blocks are placed in five sync blocks. At this point, the deshuffling circuits 15A, 15B, and 15C allocate eight compressed macro-blocks to five sync blocks that are spaced apart from each other. Likewise, the (1050/60) HDTV signal and the (1250/50) HDTV signal are recorded so that 7.5 macro-blocks are placed in five sync blocks. The 7.5 compressed macro-blocks are allocated to five sync blocks that are spaced apart from each other.

Figure 27A:
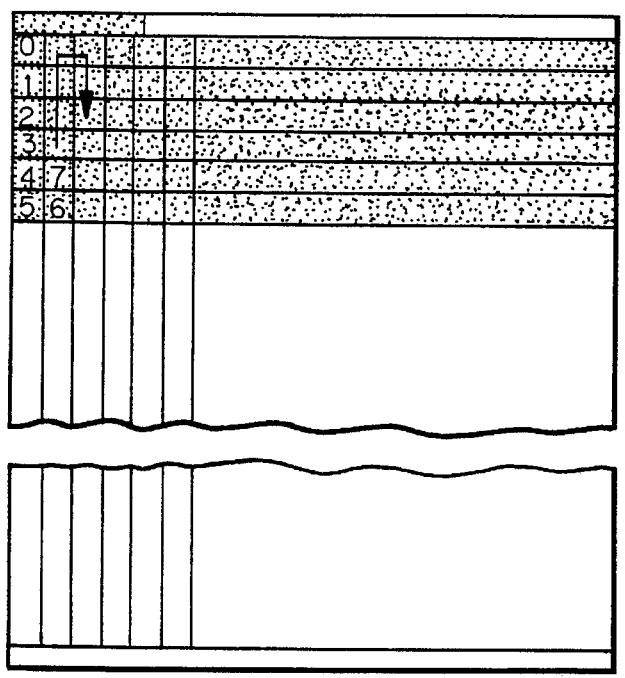
FIGS. 27A and 27B are schematic diagrams showing the relation between a sub screen and sync blocks in the case that a (1250/50) HDTV signal is recorded.
Figure 27B:
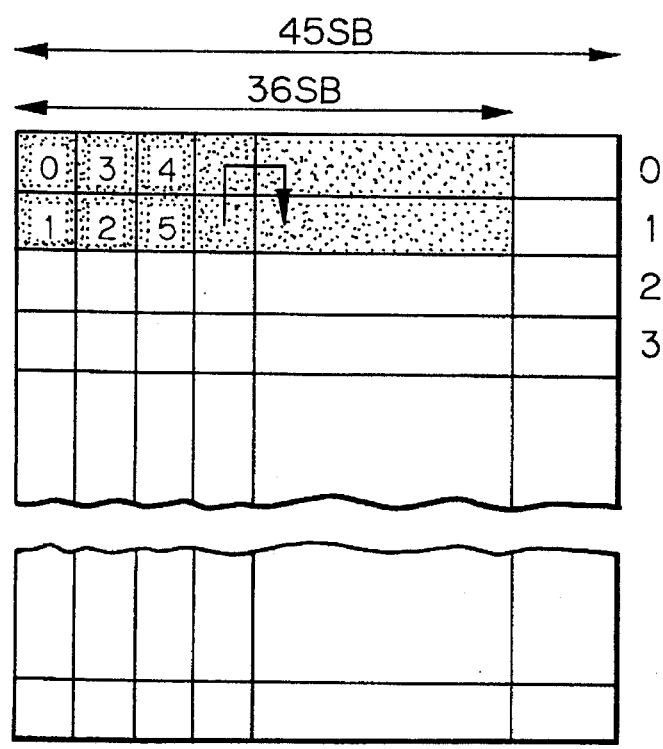
Figure 28A:
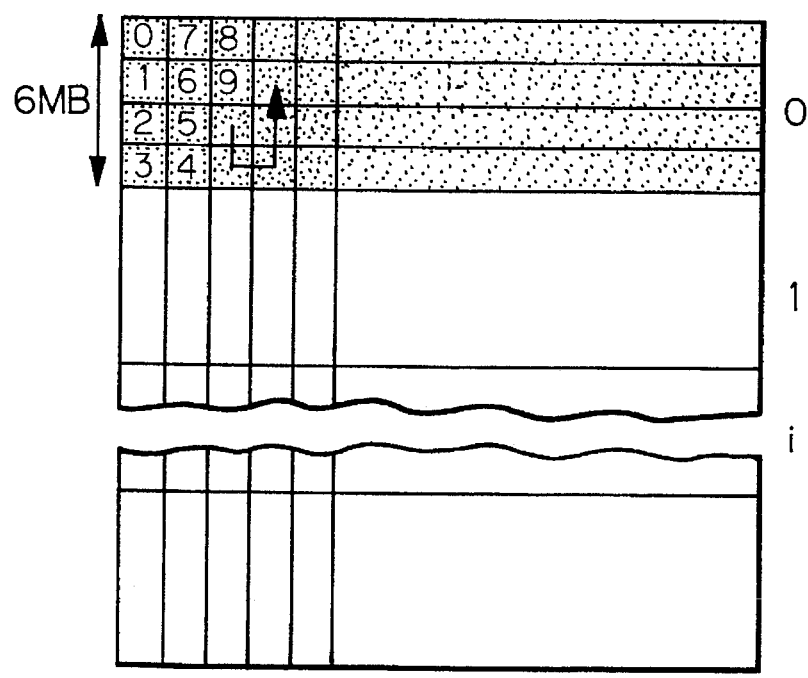
FIGS. 28A and 28B are schematic diagrams showing the relation between a sub screen and sync blocks in the case that a (1250/50) HDTV signal and a (1050/60) HDTV signal are recorded.
Figure 28B:
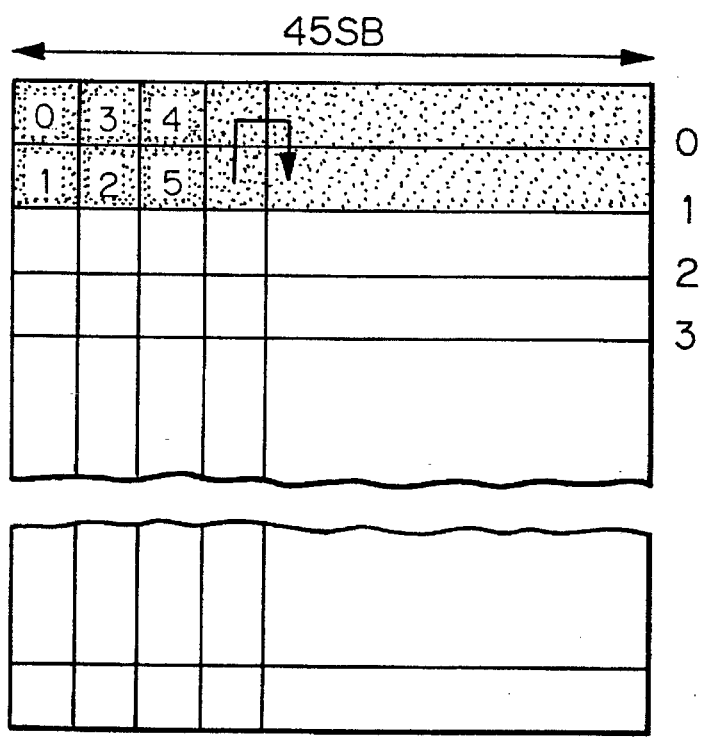

FIG. 27A shows a sub screen of the (1125/60) HDTV signal. FIG. 27B shows positions of macro-blocks placed in sync blocks on a sub screen. FIG. 28A shows a sub screen of the (1050/60) HDTV signal or the (1250/50) HDTV signal. FIG. 28B shows positions of macro-blocks placed in sync blocks on a sub screen. When the (1125/60) HDTV signal is recorded, four of five sync blocks have a fixed area of macro-blocks. Thus, the fifth sync block is allocated at an edge of a track.

Figure 29:
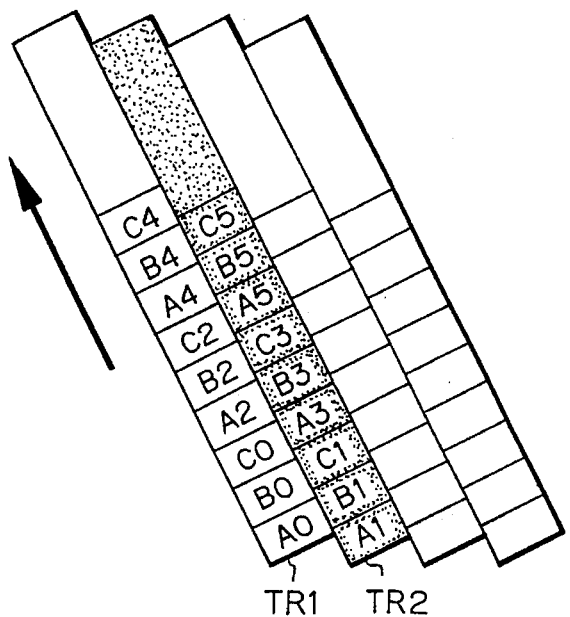
FIG. 29 is a schematic diagram showing a track pattern in the case that a (1250/50) HDTV signal and a (1050/60) HDTV signal are recorded.
Figure 30:
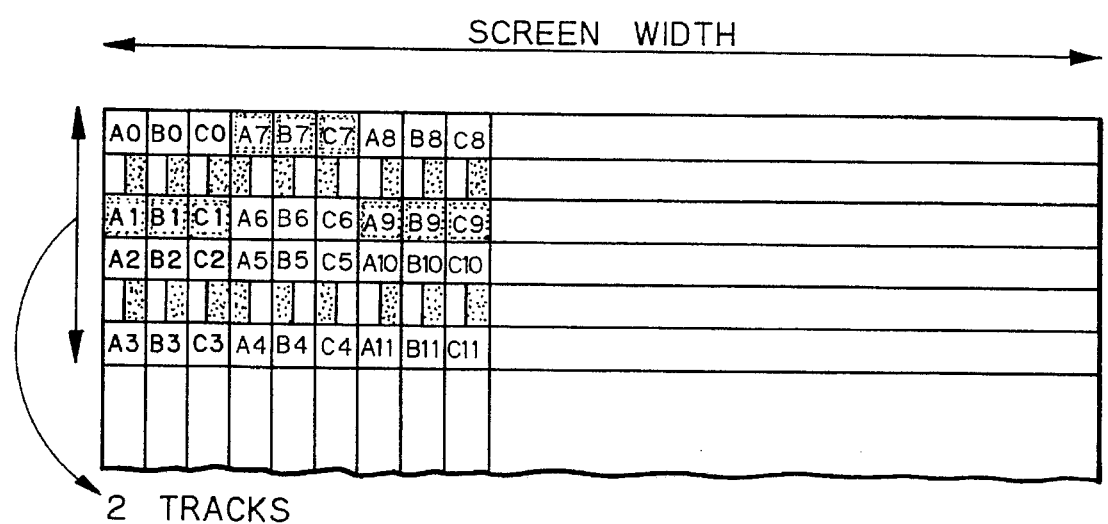
FIG. 30 is a schematic diagram showing positions of sync blocks of a (1250/50) HDTV signal and a (1050/60) HDTV signal on a screen.

FIG. 29 shows a track pattern where macro-blocks are shuffled on three paths and converted into two channels as shown in FIGS. 4 and 5 in the case that the (1050/60) HDTV signal or the (1250/50) HDTV signal is recorded. FIG. 30 shows positions of macro-blocks on a screen.

Figure 31:
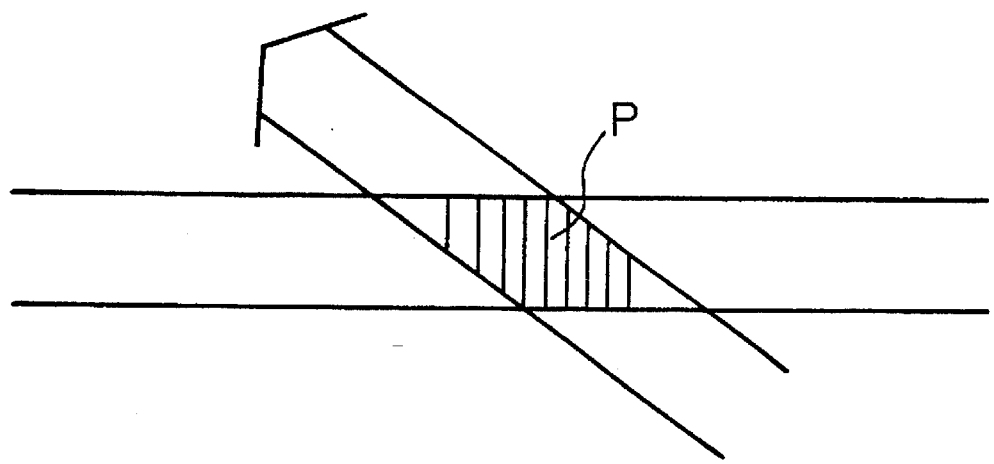
FIG. 31 is a schematic diagram for explaining a variable speed reproduction operation in the digital VCR according to the present invention.
Figure 32:
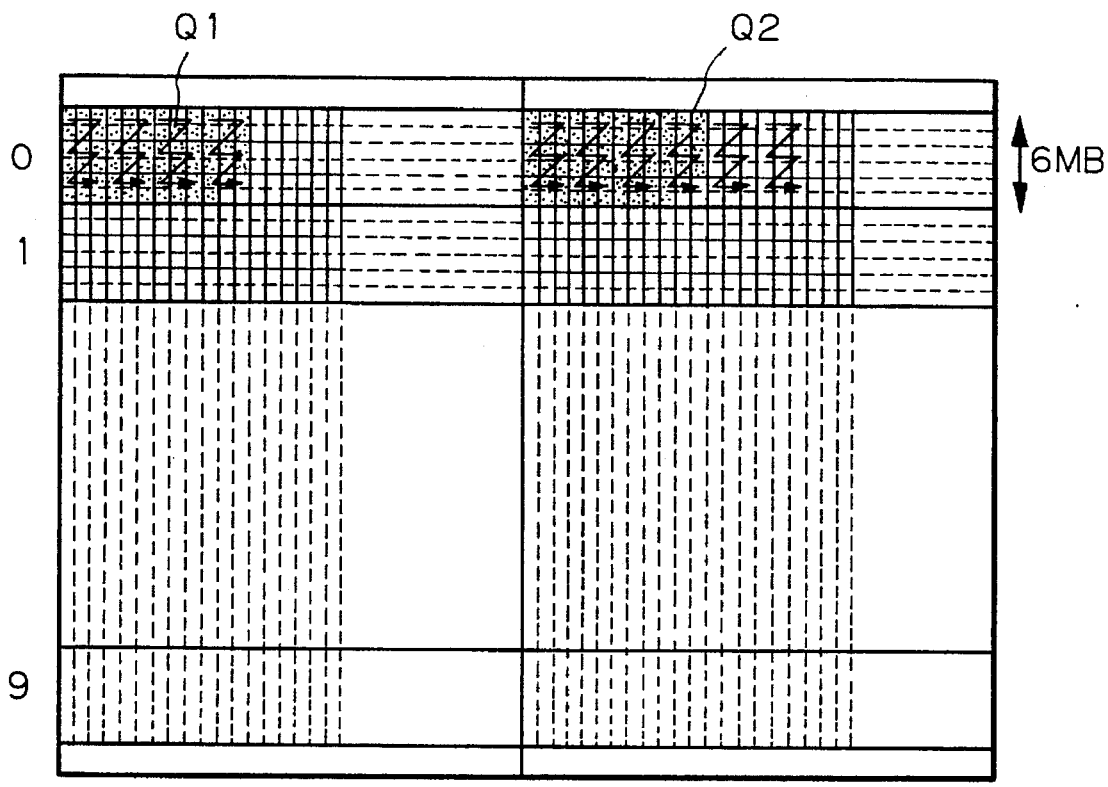
FIG. 32 is a schematic diagram for explaining a variable speed reproduction operation in the case that a (1125/60) HDTV signal is recorded.
Figure 33:
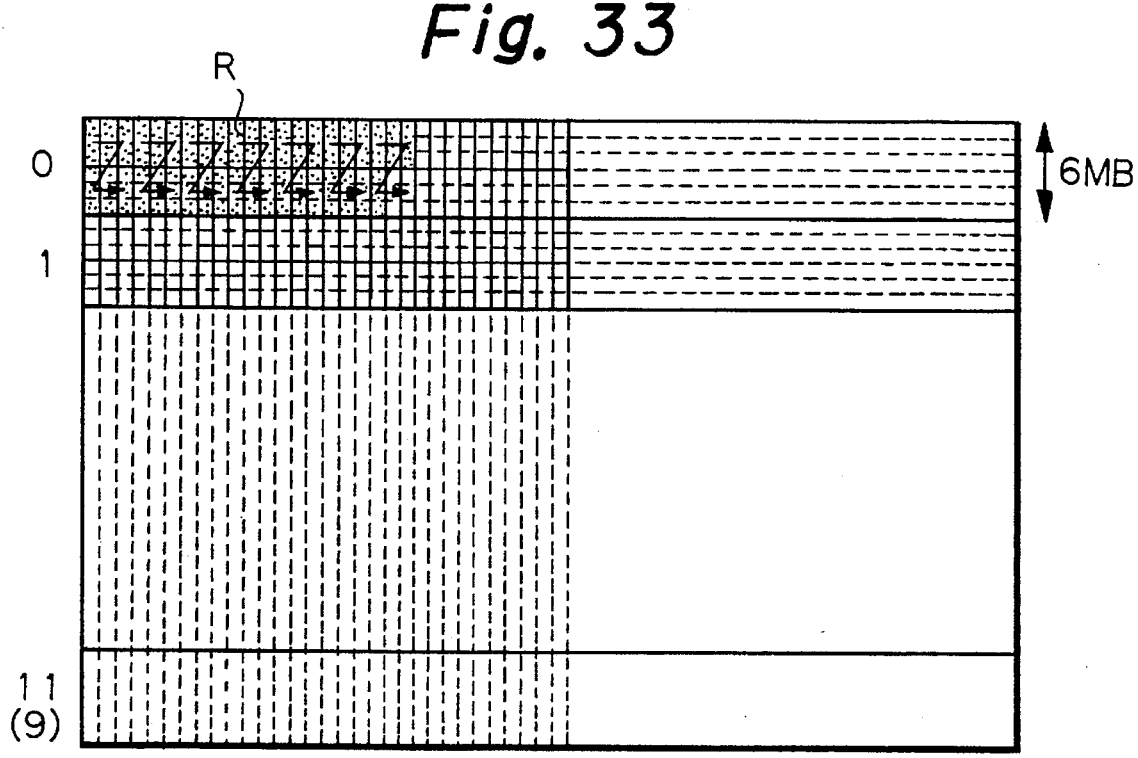
FIG. 33 is a schematic diagram for explaining a variable speed reproduction operation in the case that a (1250/50) HDTV signal and a (1050/60) HDTV signal are recorded.

When the (1050/60) HDTV signal or the (1250/50) signal is recorded as shown in FIGS. 29 and 30, a block on a screen is allocated as a block on a magnetic tape. When the variable speed reproduction operation is performed, since the heads scan the magnetic tape across the tracks, signals are reproduced as bursts. In FIG. 31, when a head extracts a portion P, portions $Q_1$ and $Q_2$ (shown in FIG. 32) of the (1125/60) HDTV signal or a portion R (shown in FIG. 33) of the (1050/60) HDTV signal is reproduced. Thus, when the variable speed reproduction operation is performed, a block portion of an image can be reproduced, thereby improving the image quality.

Figure 34:
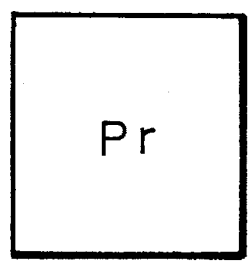
FIG. 34 is a schematic diagram showing another composition of a macro-block.
Figure 34:
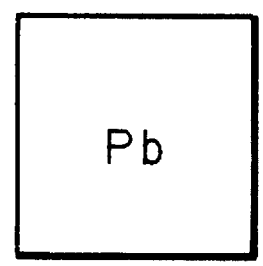

Next, an other example of the dividing operation and shuffling operation of HDTV signals corresponding to Japanese HDTV system, American HDTV system, and European HDTV system will be described in detail. In the following examples, the luminance signal received from the input terminal 1 is converted into a digital signal with a sampling frequency of 40.5 MHz by the A/D converter 4. The color difference signals PR and PB received from the input terminal 2 are converted into digital signals with a sampling frequency of 13.5 MHz by the A/D converter 5. In other words, the relation of the sampling frequencies the luminance signal, and the color difference signals PR and PB is (12:4:0). The information amount of the color difference signals PR and PB is halved by the thin-out and line sequencing circuit 6. Thus, the information amount of each of the color difference signals PR and PB becomes ⅙ times the information amount of the luminance signal Y. As shown in FIG. 34, one macro-block is composed of six DCT blocks of the luminance signal, one DCT block of the color difference signal PR, and one DCT block of the color difference signal PB. The luminance signal, and the color difference signals PR and PB are shuffled with the macro-blocks.

Figure 35:
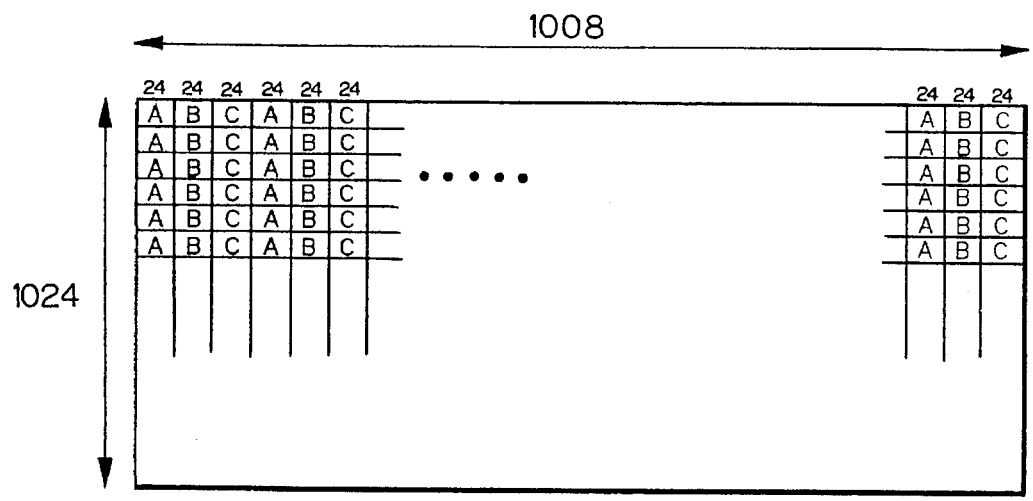

Next, an example of the recording operation of a (1125/60) HDTV signal corresponding to the Japanese HDTV system will be described. As shown in FIG. 35, in this example, the number of valid samples per line is 1008 and the number of valid lines per frame is 1024. As shown in FIG. 34, one macro-block is composed of six DCT blocks of the luminance signal, one DCT block of the corresponding color difference signal Pr, and one DCT block of the corresponding color difference signal Pb. One DCT block is composed of eight pixels in the vertical direction times eight pixels in the horizontal direction.

Thus, the number of macro-blocks per frame is as follows:

1008/24=42

1024/16=64

Thus, in the case of the (1125/60) HDTV signal, the number of macro-blocks per frame is (42×64).

In the (1125/60) HDTV signal, the number of tracks per frame is 20. As described above, when the conventional television signal is recorded, 135 sync blocks are placed per track. To commonly use the recording operation of the conventional television signal, the (1125/60) HDTV signal is recorded so that the number of sync blocks per track is 135. On the other hand, the conventional television signal is recorded so that the fixed buffer amount is five sync blocks.

Figure 36:
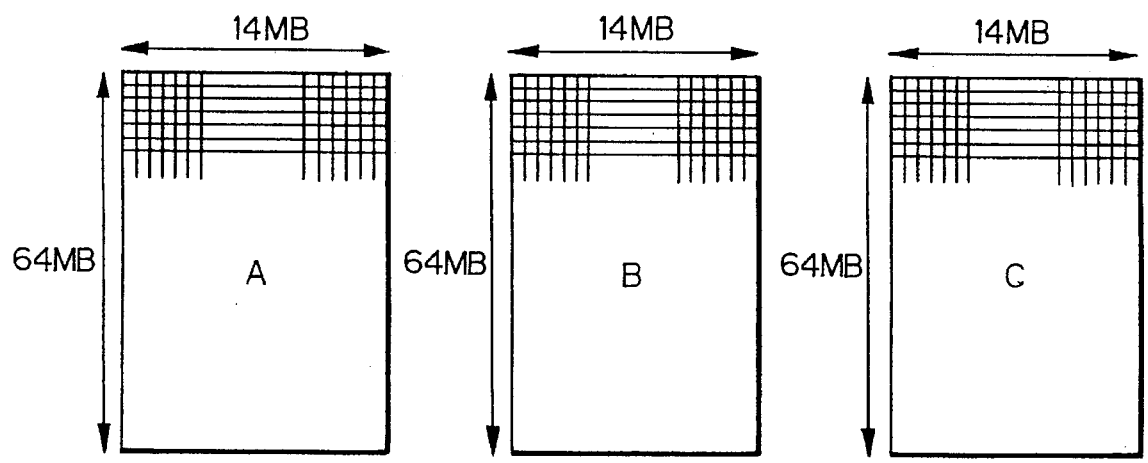
Figure 37:
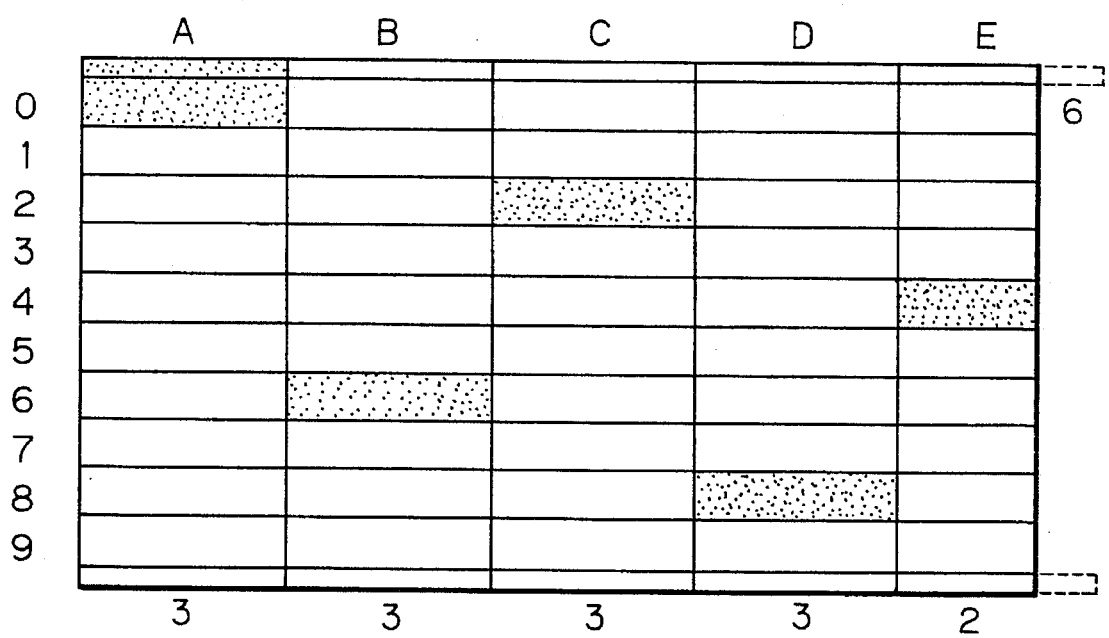

In this example, the shuffling operation is performed on three coding paths CP-A, CP-B, and CP-C. In the (1125/60) HDTV signal, the number of macro-blocks is (42×64). When these macro-blocks are processed in parallel on the three coding paths CP-A, CP-B, and CP-C, as shown in FIG. 36, one sub screen is composed of (14×64) macro-blocks. As shown in FIG. 37, the sub screen is divided into 10 portions in vertical direction and five portions in horizontal direction. Thus, super macro-blocks are formed as represented by hatched lines. One super macro-block is composed of 18 macro-blocks. Super macro-blocks at the right end of the screen and areas at the top and bottom are combined so as to form one super macro-block. When macro-blocks are shuffled, one macro-block is collected from each of the super macro-blocks in the order of numerals shown in FIG. 38.

Figure 39:
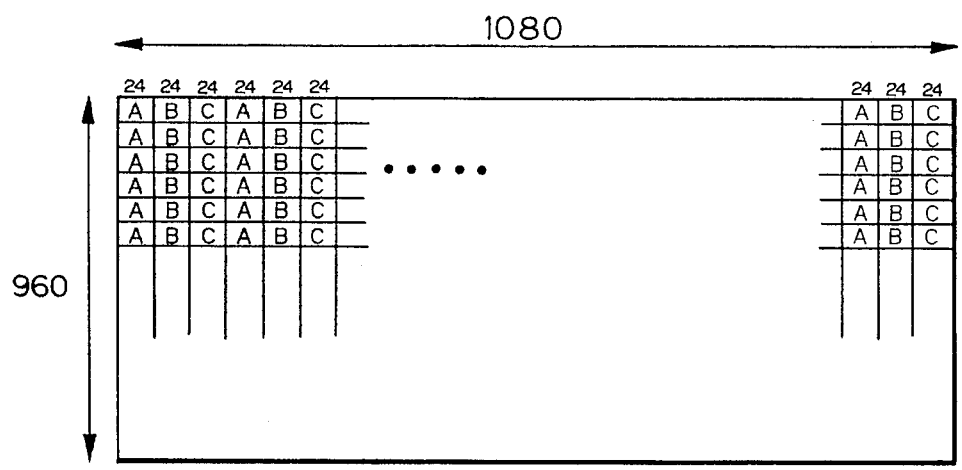

Next, an example of the recording operation of a (1050/60) HDTV signal corresponding to the American HDTV system will be described. In this example, as shown in FIG. 39, the number of valid samples per line is 1080 and the number of valid lines per frame is 960. As shown in FIG. 34, one macro-block is composed of six DCT blocks of the luminance signal, one DCT block of the corresponding color difference signal Pr, and one DCT block of the corresponding color difference signal Pb. Thus, the number of macro-blocks per frame is as follows:

1080/24=45

960/16=60

Thus, the number of macro-blocks per frame is (45×60).

In the (1050/60) HDTV signal, the number of tracks per frame is 20. When the conventional television signal is recorded, 135 sync blocks are placed per track. To commonly use the recording operation of the conventional television signal, the (1050/60) HDTV signal is recorded so that the number of sync blocks per track is 135. On the other hand, the conventional television signal is recorded so that the fixed buffer amount is five sync blocks.

Figure 40:
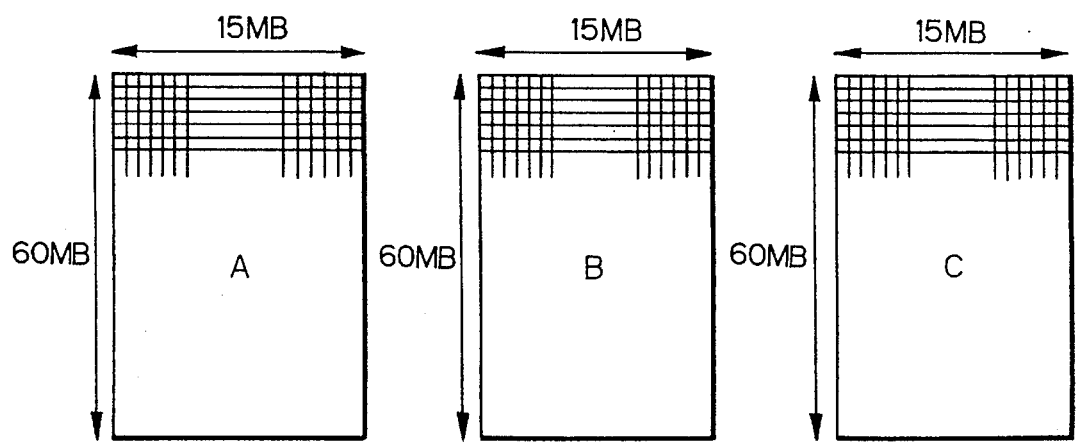
Figure 41:
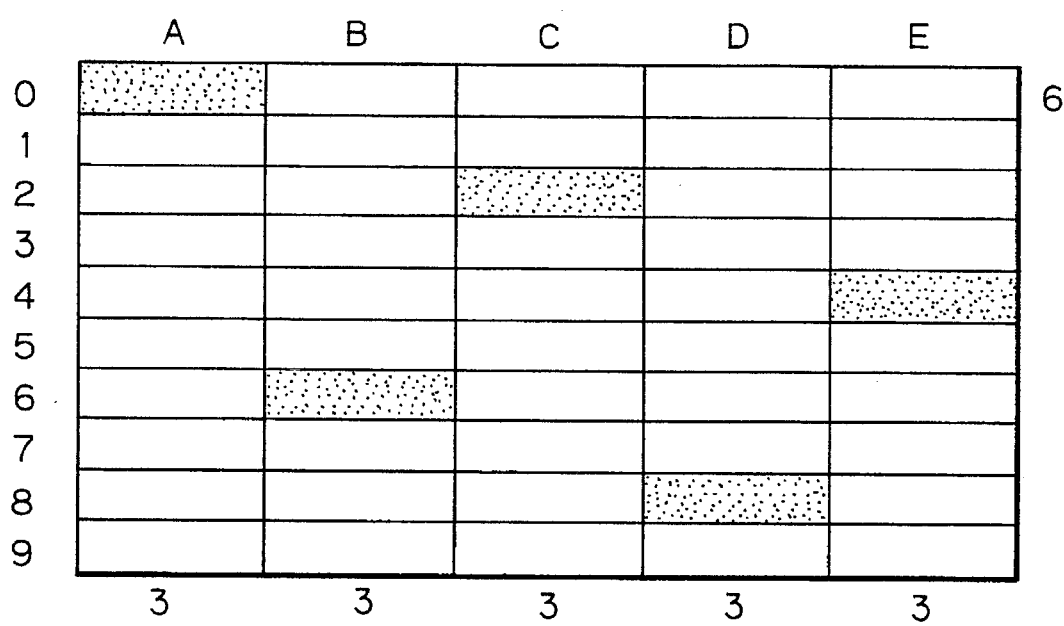

In this example, the shuffling operation is performed on three coding paths CP-A, CP-B, and CP-C. In the (1050/60) HDTV signal, the number of macro-blocks is (45×60). When these macro-blocks are processed in parallel on the three coding paths CP-A, CP-B, and CP-C, as shown in FIG. 40, one sub screen is composed of (15×60) macro-blocks. As shown in FIG. 41, the sub screen is divided into 10 portions in vertical direction and five portions in horizontal direction. Thus, super macro-blocks are formed as represented by hatched lines. When macro-blocks are shuffled, one macro-block is collected from each of the super macro-blocks in the order of numerals shown in FIG. 42.

Figure 43:
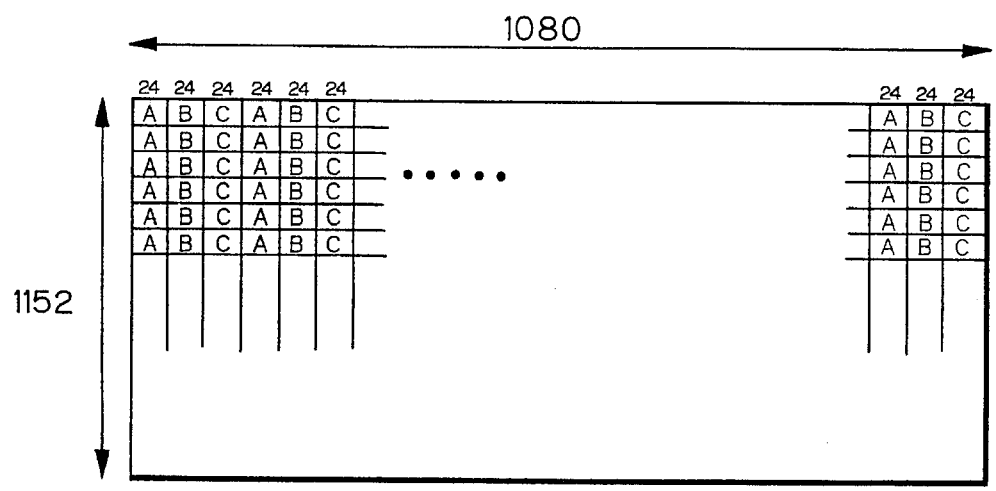

Next, an example of the recording operation of a (1250/50) HDTV signal corresponding to the European HDTV system will be described. In this example, as shown in FIG. 43, the number of valid samples per line is 1080 and the number of valid lines per frame is 1152. As shown in FIG. 34, one macro-block is composed of six DCT blocks of the luminance signal, one DCT block of the corresponding color difference signal Pr, and one DCT block of the corresponding color difference signal Pb. Thus, the number of macro-blocks per frame is as follows:

1080/24=45

1152/16=72

Thus, the number of macro-blocks per frame is (45×72).

In the (1250/50) HDTV signal, the number of tracks per frame is 24. When the conventional television signal is recorded, 135 sync blocks are placed per track. To commonly use the recording operation of the conventional television signal, the (1250/50) HDTV signal is recorded so that the number of sync blocks per track is 135. On the other hand, the conventional television signal is recorded so that the fixed buffer amount is five sync blocks.

Figure 44:
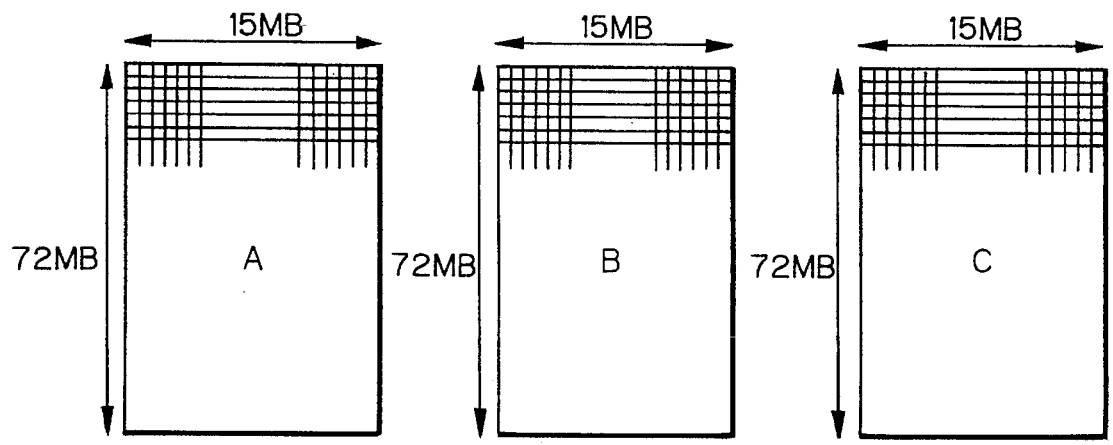
Figure 45:
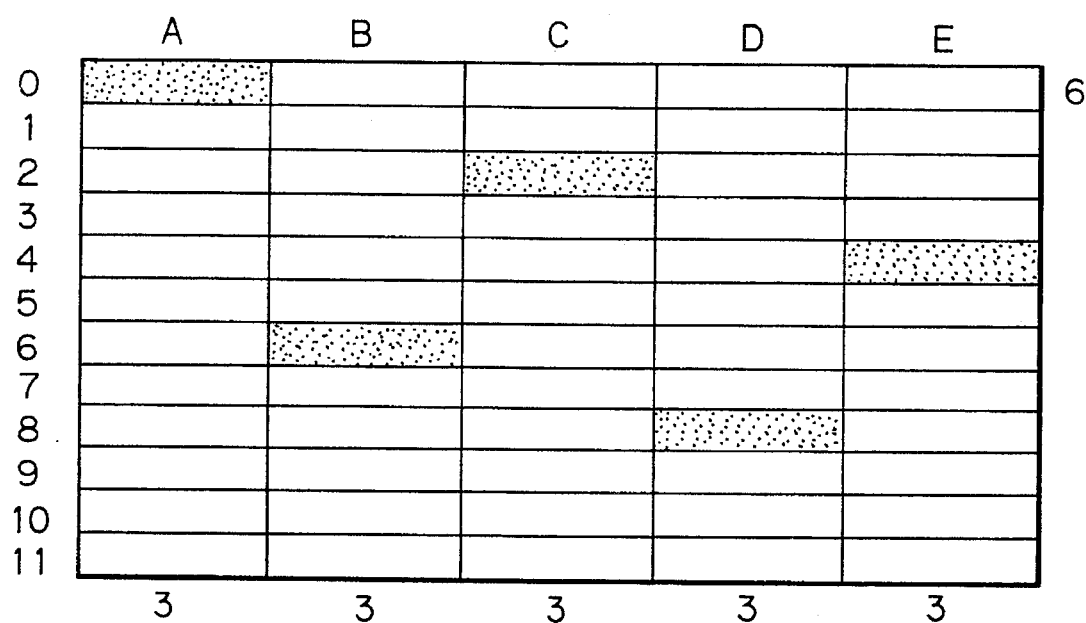

In this example, the shuffling operation is performed on three coding paths CP-A, CP-B, and CP-C. In the (1250/50) HDTV signal, the number of macro-blocks is (45×72). When these macro-blocks are processed in parallel on the three coding paths CP-A, CP-B, and CP-C, as shown in FIG. 44, one sub screen is composed of (15×72) macro-blocks. As shown in FIG. 45, the sub screen is divided into 12 portions in vertical direction and five portions in horizontal direction. Thus, super macro-blocks are formed as represented by hatched lines. When macro-blocks are shuffled, one macro-block is collected from each of the super macro-blocks in the order of numerals shown in FIG. 46.

FIG. 47 shows a frame format. As shown in FIG. 47, a fixed pattern sync S is placed at the beginning of each sync block. The sync S is followed by ID data ID and quantizing table number QNO, followed by luminance signal data Y, and color difference signal data Pr and Pb, followed by a parity. The buffer amount is fixed to five sync blocks.

Figure 48:
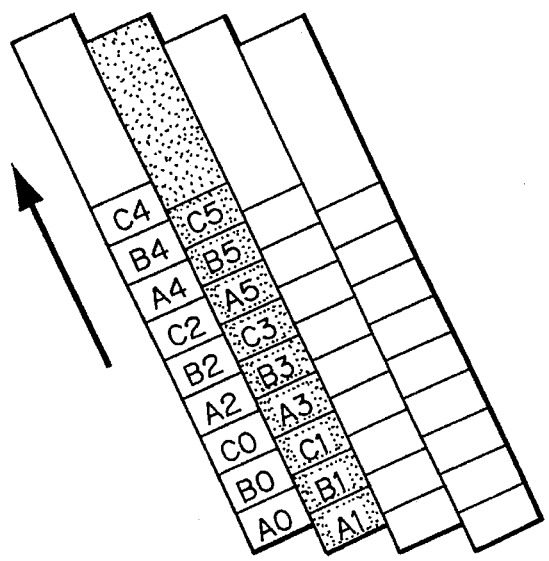
FIG. 48 is a schematic diagram for explaining a track pattern.
Figure 49:
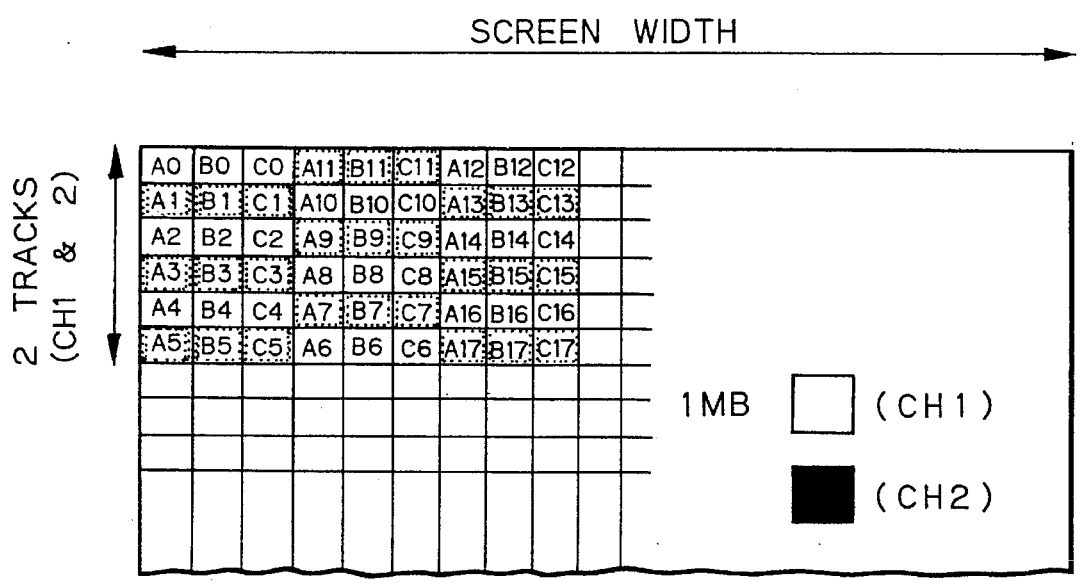
FIG. 49 is a schematic diagram for explaining positions of sync blocks on a screen.

FIG. 48 shows a track pattern where macro-blocks are shuffled on three paths in the case that the (1250/50) HDTV signal is recorded. FIG. 49 shows positions of macro-blocks on a screen. When the (1250/50) HDTV signal is recorded as shown in FIGS. 48 and 49, a block on a screen is allocated as a block on a magnetic tape. Thus, when the variable speed reproduction operation is performed, a block portion of an image can be reproduced, thereby improving the image quality.

Figure 50:
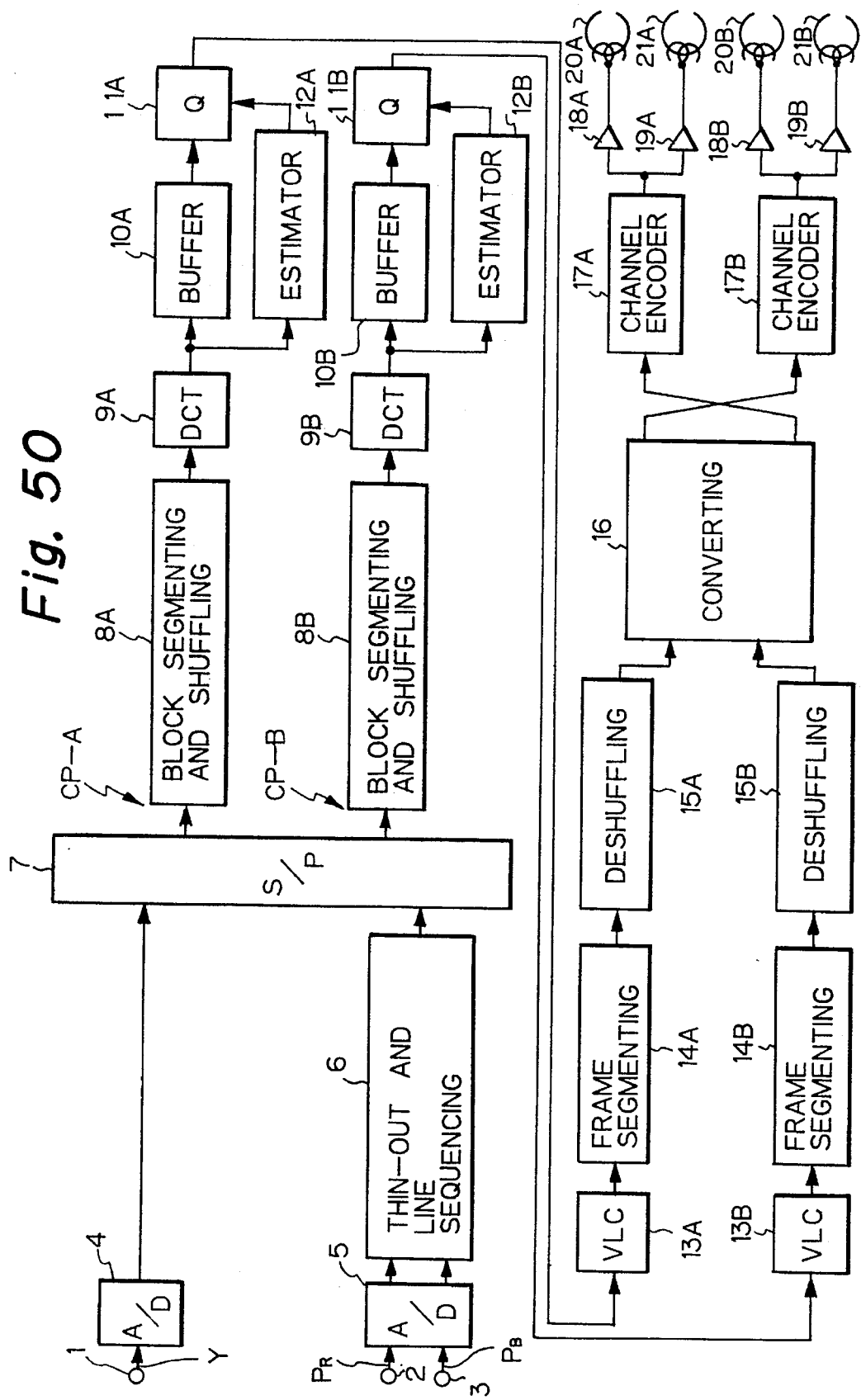
FIG. 50 is a block diagram showing another construction of the recording system of the digital VCR according to the present invention.

In this example, the HDTV signal is processed on the three coding paths. However, the HDTV signal may be processed on two coding paths, as illustrated in FIG. 50.

Figure 51:
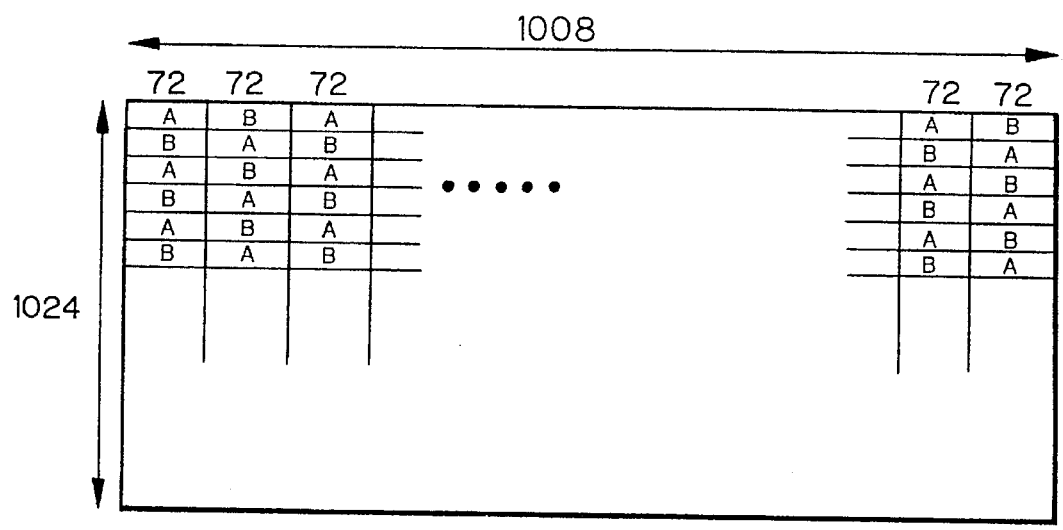
FIGS. 51 to 54 are schematic diagrams for explaining a further shuffling operation in the case that a (1125/60) HDTV signal is recorded.
Figure 52:
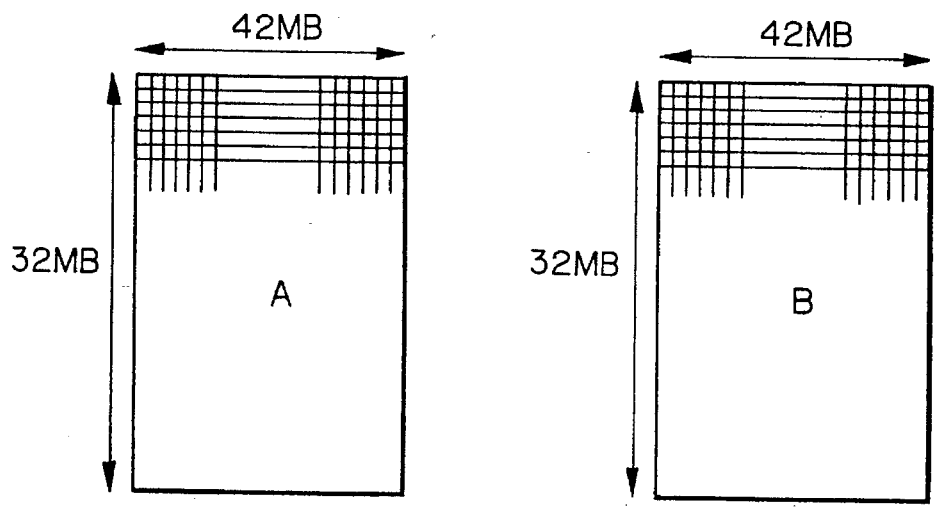
Figure 53:
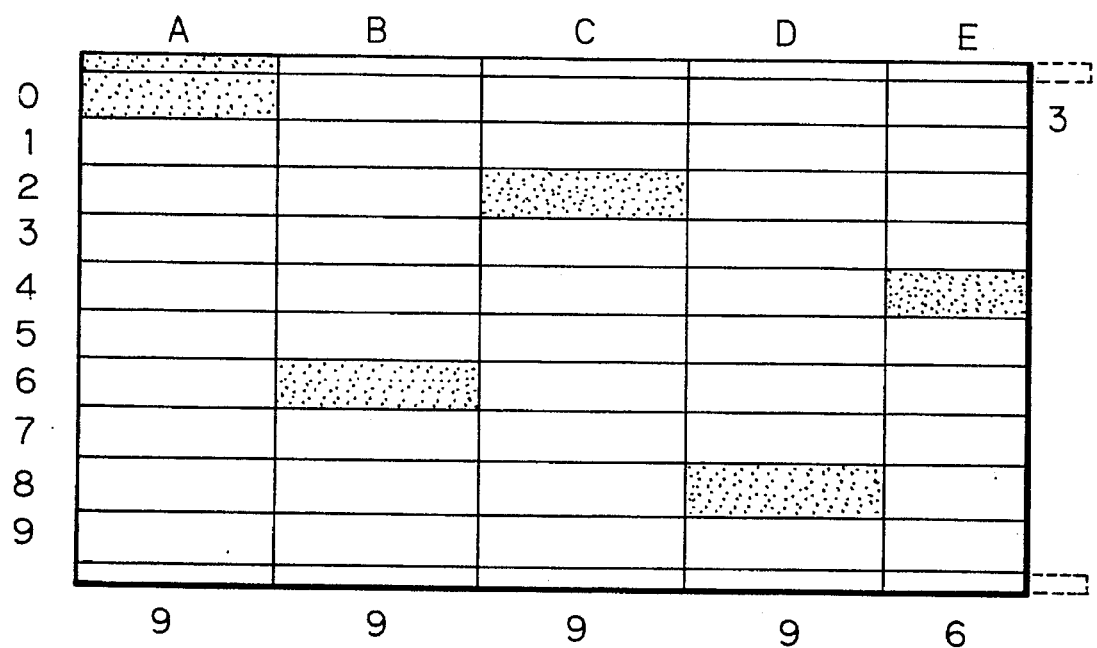
Figure 54:
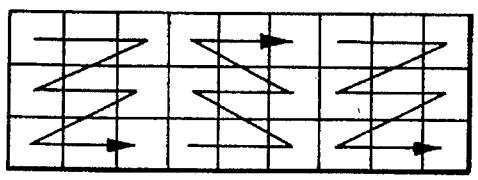
Figure 54:
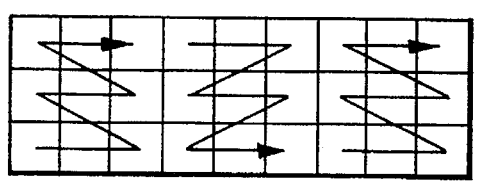
Figure 54:
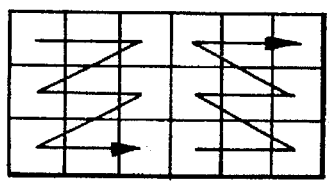

FIG. 51 shows the case where the (1125/60) HDTV signal is processed on two coding paths. In this case, as shown in FIG. 52, one sub screen is composed of (42×32) macro blocks. As shown in FIG. 53, the sub screen is divided into 10 portions in vertical direction and five portions in horizontal direction. Thus, super blocks represented by hatched lines are obtained. When the macro blocks are shuffled, one macro block is collected from each of the super blocks in the order of numerals shown in FIG. 54.

Figure 55:
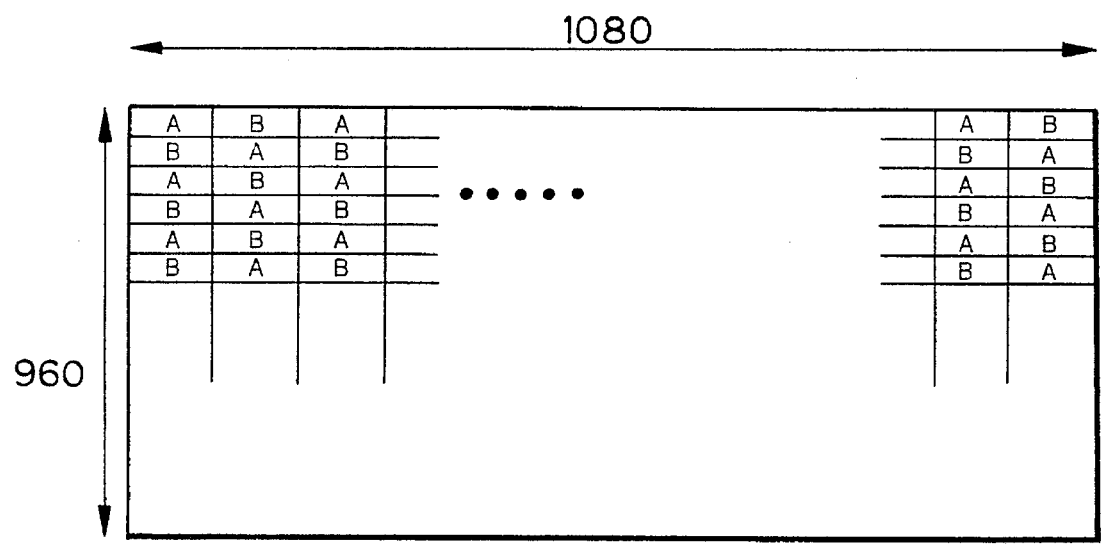
Figure 56:
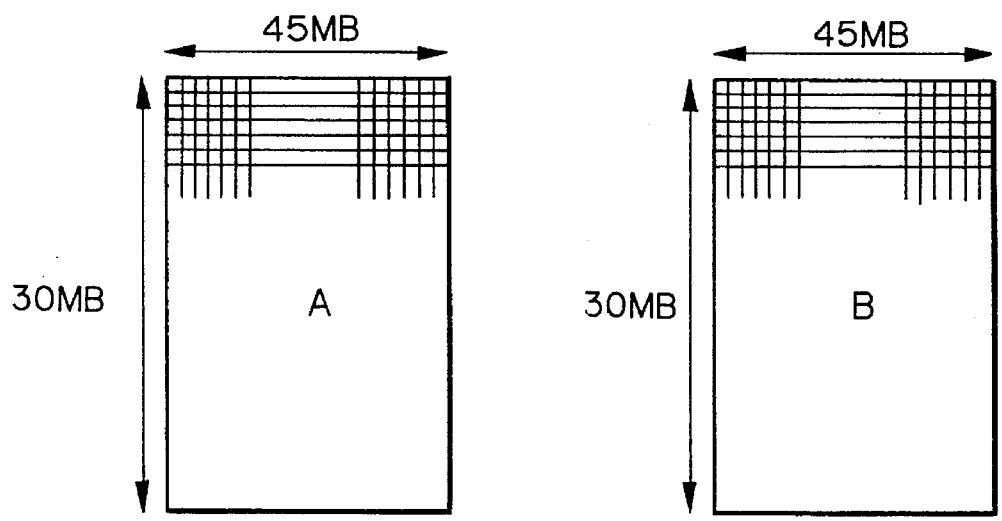
Figure 57:
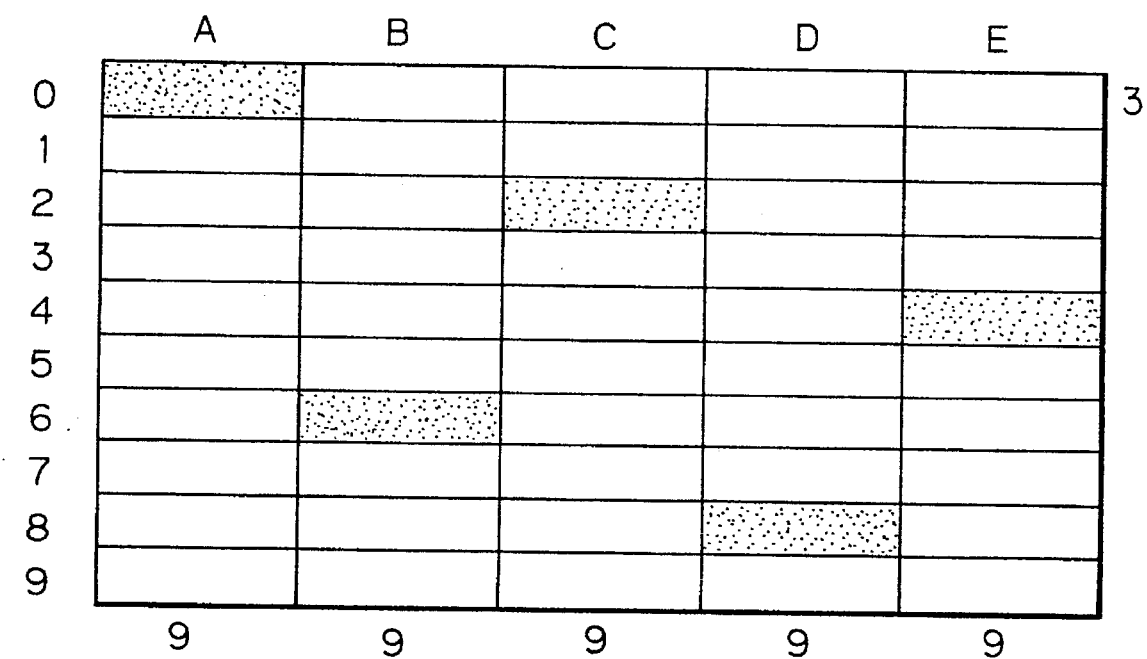

FIG. 55 shows positions of macro-blocks in the case that the (1050/60) HDTV signal is processed on two coding paths. As shown in FIG. 56, one sub screen is composed of (45×30) macro blocks. As shown in FIG. 57, the sub screen is divided into ten portions in vertical direction and five portions in horizontal direction. Thus, super blocks represented by hatched lines are obtained. When macro blocks are shuffled, one macro block is collected from each of the super blocks in the order of numerals shown in FIG. 58.

Figure 59:
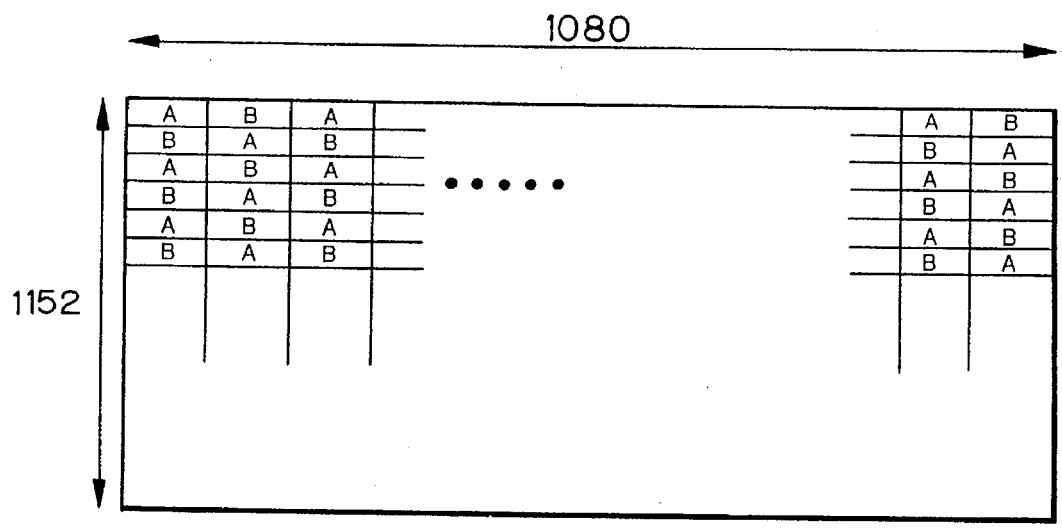
Figure 60:
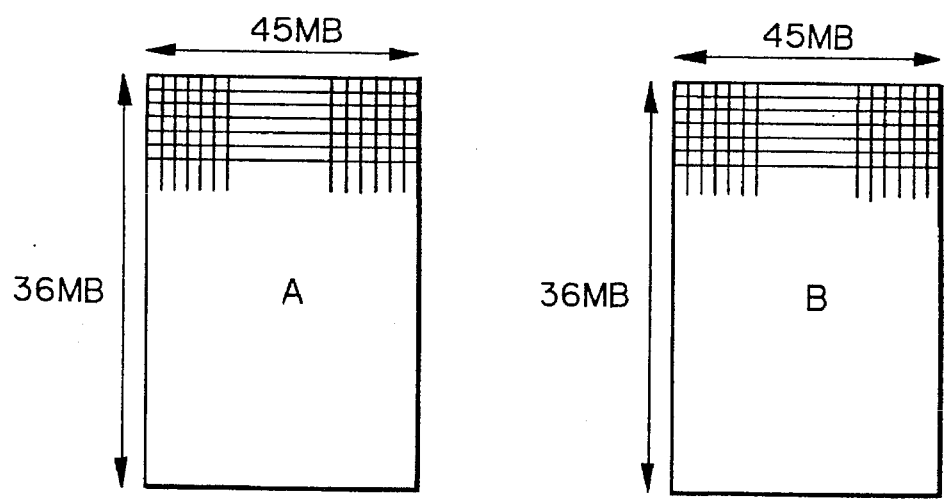
Figure 61:
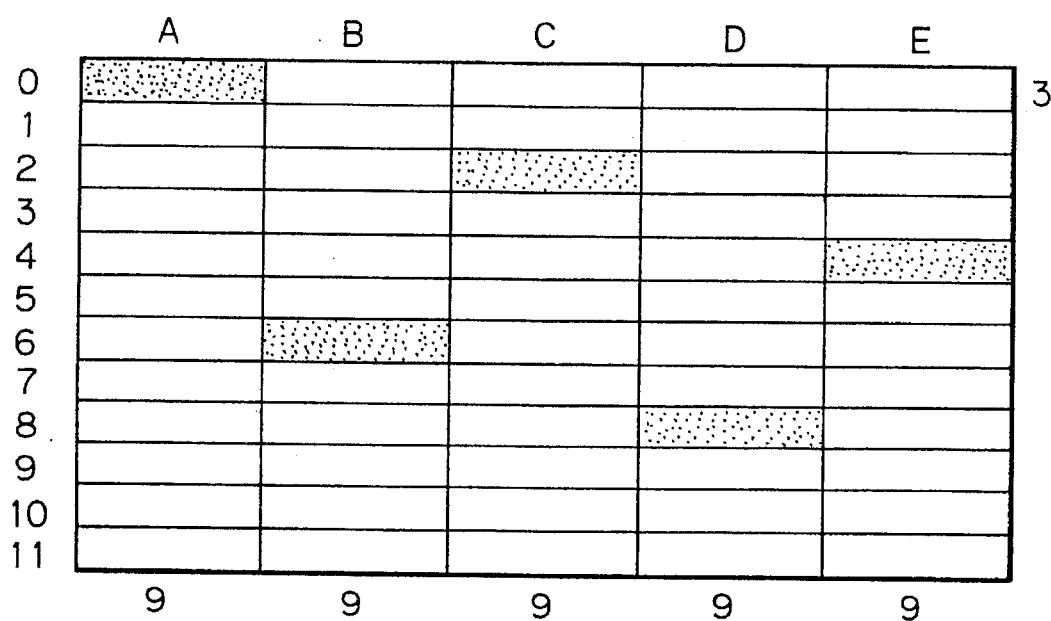

FIG. 59 shows positions of macro-blocks in the case that the (1250/50) HDTV signal is processed on two coding paths. As shown in FIG. 60, one sub screen is composed of (45×36) macro blocks. As shown in FIG. 61, the sub screen is divided into twelve portions in vertical direction and five portions in horizontal direction. Thus, super blocks represented by hatched lines are obtained. When macro blocks are shuffled, one macro block is collected from each of the super blocks in the order of numerals shown in FIG. 62.

What is claimed is:

1. A digital video signal recording apparatus, comprising:
   an analog-to-digital converting circuit for converting an analog luminance signal and color difference signals into respective digital signals; and
   a dividing circuit for dividing the digital luminance signal and the digital color difference signals into a plurality of coding paths, the coding paths being adapted to perform an encoding process so as to compress and encode the digital luminance signal and the digital color difference signals, each of said coding paths including:
      a block segmenting and shuffling circuit for block segmenting and shuffling signals output from said analog-to-digital converting circuit;
      a DCT circuit for performing a two-dimensional discrete cosine transform on signals output from said block segmenting and shuffling circuit;
      a buffer circuit having a storage capacity for buffering signals output from said DCT circuit;
      an estimator for estimating a data amount of a predetermined buffer amount to be output;
      a quantizing circuit for setting a quantizing scale corresponding to an output of said estimator and for quantizing signals output from said buffer circuit;
      a variable length code encoding circuit for encoding an output of said quantizing circuit into variable length code;
      a frame segmenting circuit for framing signals and placing a predetermined sync pattern in signals output from said variable length code encoding circuit so as to perform error correction encoding; and
      a deshuffling circuit for deshuffling signals output from said frame segmenting circuit;
   a channel converting circuit for converting signals received from said coding paths to signals with a predetermined number of channels; and
   a recording circuit for recording signals output from said channel converting circuit on a predetermined recording medium.

2. The digital video signal recording apparatus as set forth in claim 1, wherein the number of said coding paths is three.

3. The digital video signal recording apparatus as set forth in claim 2, wherein the number of the predetermined channels is two, said channel converting circuit being adapted to allocate data to a predetermined region of a magnetic tape so that a block of data is reproduced as bursts on a screen in a variable speed reproduction mode.

4. The digital video signal recording apparatus as set forth in claim 1, wherein the number of the predetermined channels is two, said channel converting circuit being adapted to allocate data to a predetermined region of a magnetic tape so that a block of data is reproduced as bursts on a screen in a variable speed reproduction mode.

5. The digital video signal recording apparatus as set forth in claim 1, 2, 3, or 4, wherein said frame segmenting circuit is adapted to perform frame segmentation with a fixed length of five sync blocks.

6. The digital video signal recording apparatus as set forth in claim 5, wherein said recording circuit is adapted to record one frame of the video signal on 20 tracks.

7. The digital video signal recording apparatus as set forth in claim 1, 2, 3 or 4, wherein said recording circuit is adapted to record one frame of the video signal on 20 tracks.

8. The digital video signal recording apparatus as set forth in claim 5, wherein said recording circuit is adapted to record 135 sync blocks of the video signal on one track.

9. The digital video signal recording apparatus as set forth in claim 1, 2, 3, or 4, wherein said recording circuit is adapted to record 135 sync blocks of the video signal on one track.

10. A digital video signal recording apparatus, comprising;
    dividing means for dividing one screen of a HDTV signal into a plurality of sub screens;
    a plurality of coding paths, one for each sub screen, each coding path including:
       means for forming macro-blocks from said sub screen, each macro-block being formed of an array of luminance blocks arranged as a multiple of three luminance blocks in the horizontal direction by a multiple of two luminance blocks in the vertical direction;
       means for shuffling the macro-blocks in said sub screen, and
       wherein a number of valid samples per line for each said screen of the HDTV signal is substantially the same as a multiple of three and a number of lines of the HDTV signal for each said screen is substantially the same as a multiple of two; and
       means for compressing the shuffled macro-blocks; and
    means for recording the shuffled and compressed signals with a predetermined number of channels on a recording medium.

11. A digital video signal reproducing apparatus, comprising:
    a reproducing circuit for reproducing signals with a predetermined number of channels from a recording medium; and
    a channel converting circuit for converting signals output from said reproducing circuit into a plurality of decoding paths, wherein each decoding path includes:
       a shuffling circuit for shuffling the reproduced signals;
       a deframing circuit for decompressing signals and performing error correction processing on signals output from said shuffling circuit;
       a variable length code decoding circuit for decoding signals output from said deframing circuit;
       an inverse-quantizing circuit for inverse-quantizing signals output from said variable length code decoding circuit;

an inverse-DCT circuit for performing an inverse-DCT operation on the signals output from said inverse-quantizing circuit; and a deshuffling circuit for deshuffling signals outout from said inverse-DCT circuit.

12. A digital video signal recording method, comprising the steps of:

converting an analog luminance signal and color difference signals into respective digital signals;

dividing the digital luminance signal and the digital color difference signals into a plurality of coding paths, the coding paths being adapted to perform a coding process so as to compress and encode the digital luminance signal and the color difference signals, the coding process including the steps of:

block segmenting and shuffling the converted digital signals;

performing a two-dimensional discrete cosine transform on the block segmented and shuffled signals;

buffering the two-dimensional discrete cosine transformed signals estimating a data amount of a predetermined amount of buffered signals;

setting a quantizing scale corresponding to the estimated data amount;

quantizing the buffered signals based on the quantization scale encoding the quantized signals into a variable length code;

placing a predetermined sync pattern in the encoded quantized signals so as to perform error correction encoding; and deshuffling the encoded signals which contain the predetermined sync pattern;

converting output signals received from said coding paths to signals with a predetermined number of channels; and recording said signals with a predetermined number of channels on a predetermined recording medium.

13. A digital video signal recording method comprising the steps of:

dividing one screen of a HDTV signal into a plurality of sub screens, performing an encoding process for each sub screen on one of a plurality of coding paths, including the steps of:

forming macro-blocks from each sub screen, each macro-block being formed of an array of luminance blocks arranged as a multiple of three luminance blocks in the horizontal direction by a multiple of two luminance blocks in the vertical direction;

shuffling the macro-blocks in said sub screen, and wherein a number of valid samples per line for each said screen of the HDTV signal is substantially the same as a multiple of three, and a number of lines of the HDTV signal for each said screen is substantially the same as a multiple of two, and compressing the shuffled macro-blocks; and recording the shuffled and compressed signals with a predetermined number of channels on a recording medium.

* * * * *